(12) United States Patent
Okazaki

(10) Patent No.: US 7,831,143 B2
(45) Date of Patent: Nov. 9, 2010

(54) ELECTRONIC DEVICE

(75) Inventor: Takashi Okazaki, Hyogo (JP)

(73) Assignee: Sony Corporation, Tokyo (JP)

( * ) Notice: Subject to any disclaimer, the term of this patent is extended or adjusted under 35 U.S.C. 154(b) by 237 days.

(21) Appl. No.: 12/053,123

(22) Filed: Mar. 21, 2008

(65) Prior Publication Data

US 2008/0240694 A1    Oct. 2, 2008

(30) Foreign Application Priority Data

Mar. 28, 2007    (JP)    ............................. 2007-084367

(51) Int. Cl.
*G03B 17/02* (2006.01)

(52) U.S. Cl. ................... 396/540; 396/544; 396/502; 396/425

(58) Field of Classification Search ............... 396/50, 396/297–300, 425, 535, 540, 388, 544
See application file for complete search history.

(56) References Cited

U.S. PATENT DOCUMENTS

| 2005/0143124 | A1* | 6/2005 | Kennedy et al. | .......... 455/556.1 |
| 2006/0017694 | A1* | 1/2006 | Shikata | ....................... 345/158 |
| 2006/0038907 | A1* | 2/2006 | Katsuura | ............... 348/333.01 |

FOREIGN PATENT DOCUMENTS

| JP | 2002-262152 | 9/2002 | | |
| JP | 2005165019 A | * | 6/2005 | ................. 396/425 |
| JP | 2005252797 A | * | 9/2005 | ................. 396/535 |
| JP | 2005333340 A | * | 12/2005 | ................... 396/50 |
| JP | 2006-33724 | | 2/2006 | |
| JP | 2006-145761 | | 6/2006 | |
| JP | 2007171806 A | * | 7/2007 | ................... 396/50 |

OTHER PUBLICATIONS

Canon EOS D30 Instruction Manual.*
Canon USA Inc press release dated Feb. 21, 2006 indicating availibility of EOS D30 on Feb. 26, 2006.*
English machine translation of Fushimoto (JP 2005-252797 A).*

* cited by examiner

*Primary Examiner*—Melissa J Koval
*Assistant Examiner*—Leon W Rhodes
(74) *Attorney, Agent, or Firm*—Oblon, Spivak, McClelland, Maier & Neustadt, L.L.P.

(57) ABSTRACT

An electronic device includes an operation member which is arranged within a range where a particular finger of right hand gripping the electronic device in a vertical orientation reaches and in which assigned functions can be customized, a storage unit adapted to store information on a first function and a second function which are set in the operation member as the assigned functions, an orientation information obtaining unit adapted to obtain information on an orientation related to the electronic device, a function assignment control unit adapted to assign the first function to the operation member when it is determined based on the information on the orientation that the electronic device is in a horizontal orientation and assign the second function to the operation member when it is determined based on the information on the orientation that the electronic device is in the vertical orientation.

17 Claims, 15 Drawing Sheets

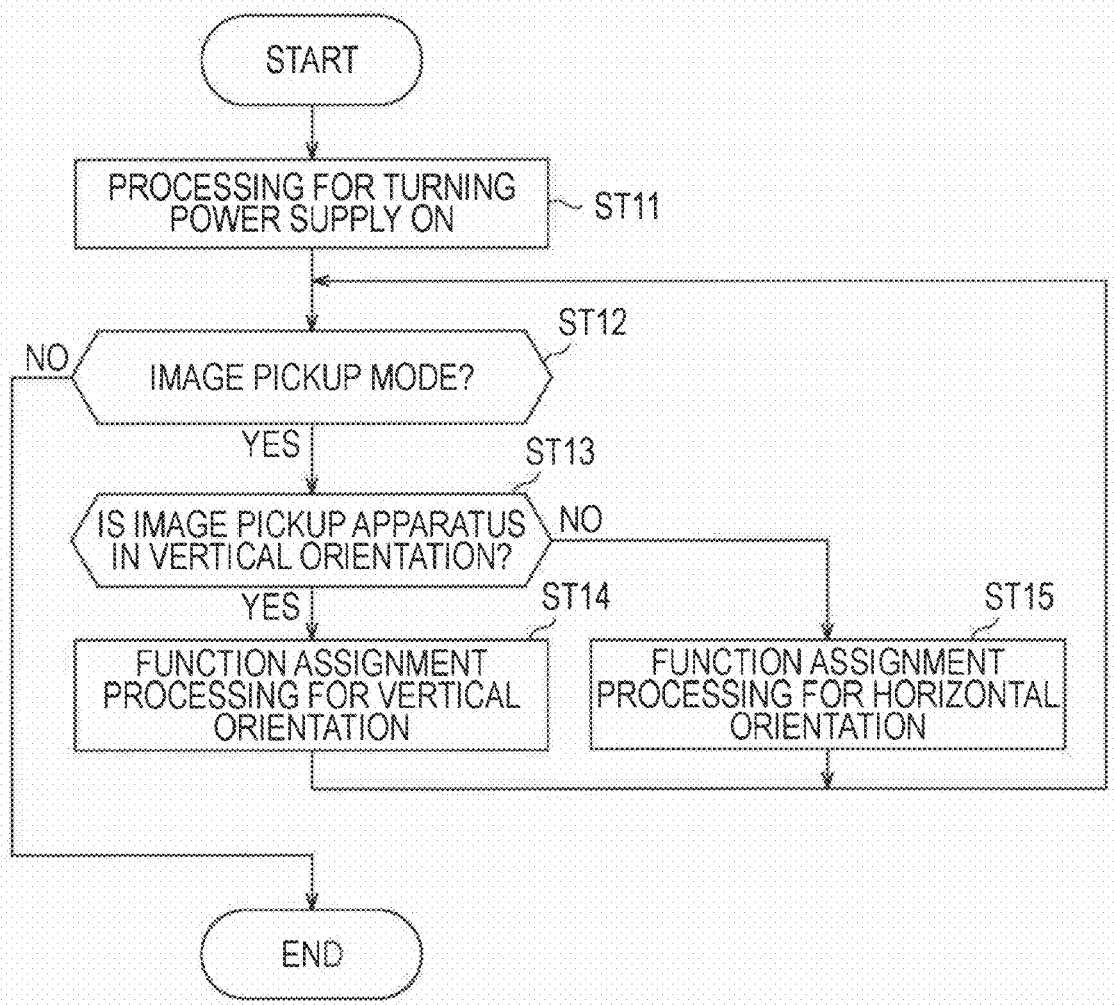

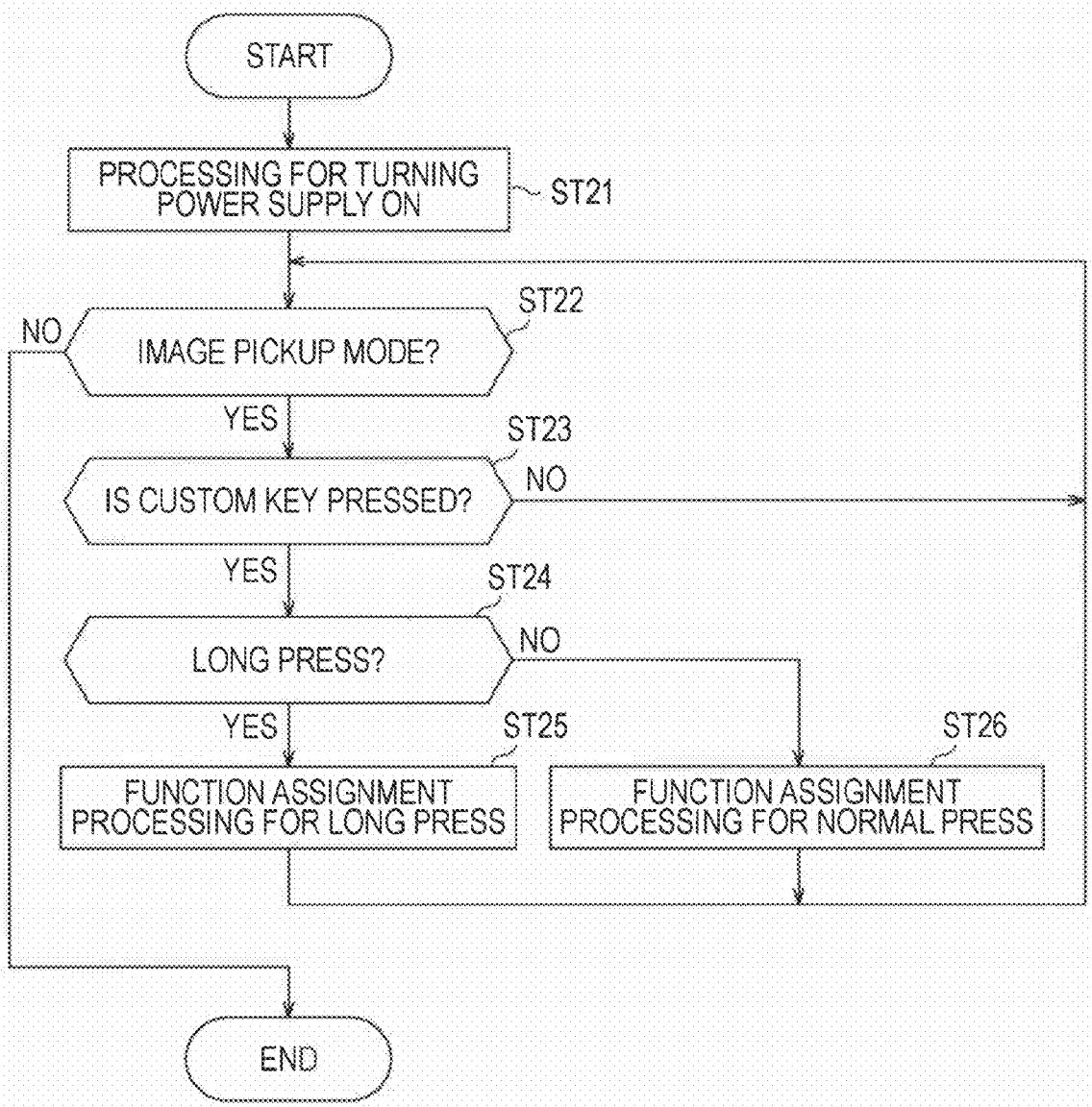

ELECTRONIC DEVICE

CROSS REFERENCES TO RELATED APPLICATIONS

The present invention contains subject matter related to Japanese Patent Application JP 2007-084367 filed in the Japanese Patent Office on Mar. 28, 2007, the entire contents of which are incorporated herein by reference.

BACKGROUND OF THE INVENTION

1. Field of the Invention

The present invention relates to an electronic device provided with an operation member in which assigned functions can be customized.

2. Description of the Related Art

In certain image pickup apparatuses (electronic devices), in order to improve operability not only during use in a horizontal orientation (standard orientation) (for example, during image pickup) but also during use in a vertical orientation, functions assigned to particular keys are automatically changed in accordance with the respective orientations (for example, Japanese Unexamined Patent Application Publication Nos. 2006-33724 and 2006-145761).

However, in the above-mentioned image pickup apparatuses, assigned functions set for the horizontal orientation and the vertical orientation are fixed. Therefore, it may be difficult for the user to customize the assigned functions, and this situation is inconvenient.

On the other hand, Japanese Unexamined Patent Application Publication No. 2002-262152, for example, discloses an image pickup apparatus in which a function assigned to a particular key can be customized. In this image pickup apparatus, a predetermined function which is frequently used by a user is assigned to an operation member (a particular key or the like) and the operation member is operated, so that the desired function can be easily realized.

SUMMARY OF THE INVENTION

However, in the image pickup apparatus disclosed in Japanese Unexamined Patent Application Publication No. 2002-262152, it is hard to mention that a sufficient consideration is provided on a position of the operation member in which the customization of the assigned functions can be realized.

For example, in the image pickup apparatus disclosed in Japanese Unexamined Patent Application Publication No. 2002-262152, the operation member in which the customization of the assigned functions can be realized is provided on a back face on a left side. A user mainly uses right hand to grip the image pickup apparatus at a right part of its main body unit in many cases. To operate the operation member in such a case, left hand (which is not a dominant hand in many cases) gripping other part (a lens part or the like) is used or the gripping state by the right hand is once released and then the right hand is used. Therefore, the operability is not particularly satisfactory. This situation is not only applied to the use of the image pickup apparatus in the horizontal orientation (standard orientation) but also applied to the use of the image pickup apparatus in the vertical orientation which is not standard orientation.

The present invention has been made in view of the above-mentioned problems, and it is desirable to provide an electronic device in which high operability can be obtained even in the vertical orientation which is not the standard orientation.

According to an embodiment of the present invention, there is provided an electronic device including an operation member which is arranged within a range where a particular finger related to right hand gripping the electronic device in a vertical orientation reaches and in which assigned functions can be customized, a storage unit adapted to store information on a first function and a second function which are set in the operation member as the assigned functions, an orientation information obtaining unit adapted to obtain information on an orientation related to the electronic device, a function assignment control unit adapted to assign the first function to the operation member when it is determined based on the information on the orientation that the electronic device is in a horizontal orientation and assign the second function to the operation member when it is determined based on the information on the orientation that the electronic device is in the vertical orientation, in which the horizontal orientation and the vertical orientation correspond to a standard orientation and a non-standard orientation during use of the electronic device.

According to the embodiment of the present invention, to the operation member which is arranged within a range where a particular finger related to right hand gripping the electronic device in a vertical orientation reaches and in which assigned functions can be customized, the first function stored in the storage unit is assigned when it is determined based on the information on the orientation related to the electronic device that the electronic device is in a horizontal orientation, and the second function stored in the storage unit is assigned when it is determined based on the information on the orientation that the electronic device is in the vertical orientation. As a result, high operability can be obtained even during use of the electronic device in the vertical orientation which is not the standard orientation.

BRIEF DESCRIPTION OF THE DRAWINGS

FIG. 12 is a flowchart for a basic operation of the image pickup apparatus;

FIG. 20 is a flowchart for a basic operation of the image pickup apparatus.

DESCRIPTION OF THE PREFERRED EMBODIMENTS

First Embodiment

Main part configuration of electronic device

Figure 1:
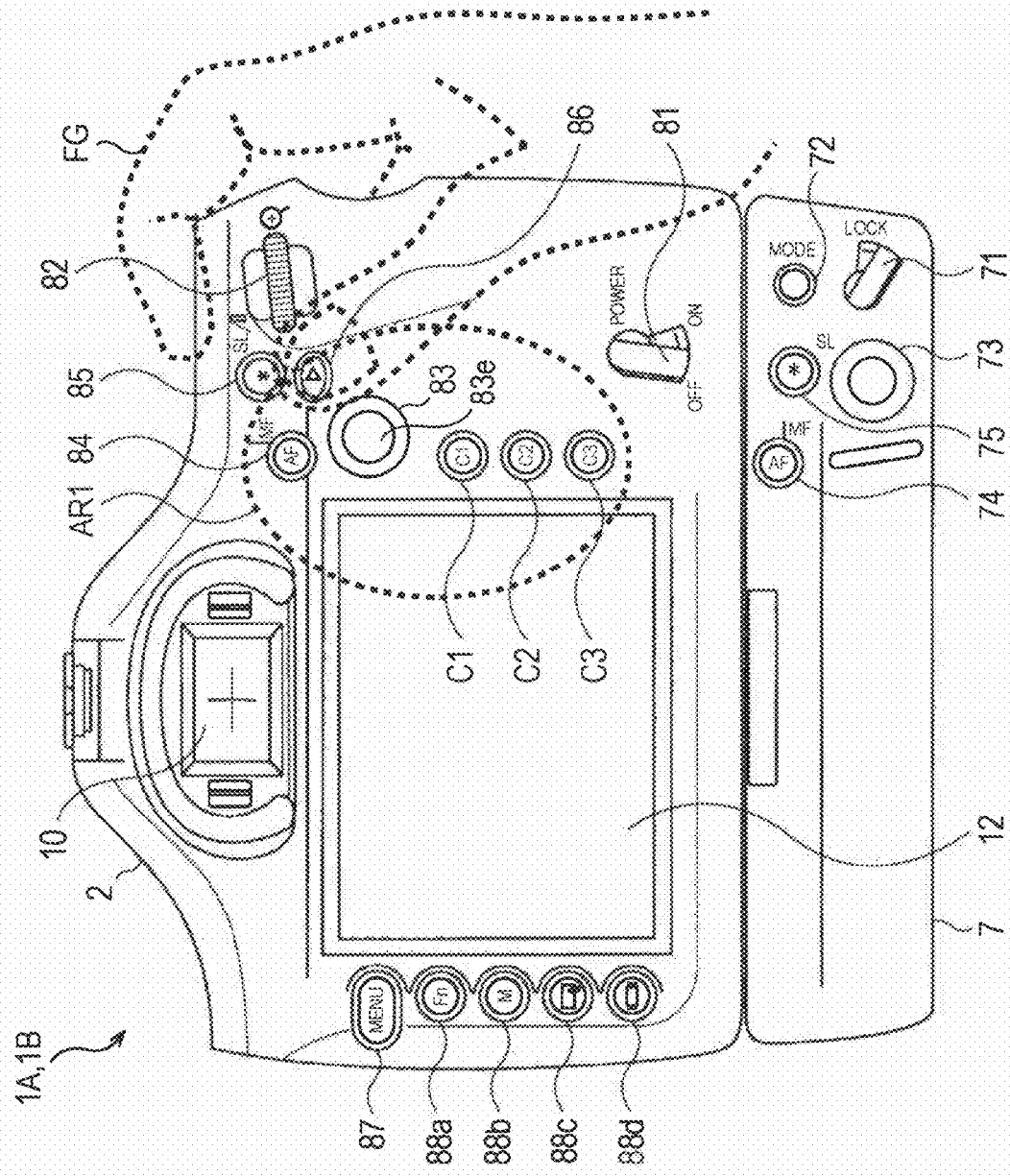
FIG. 1 is a rear external view of an image pickup apparatus (horizontal orientation) to which a vertical position control grip is mounted according to a first embodiment of the present invention.
Figure 2:
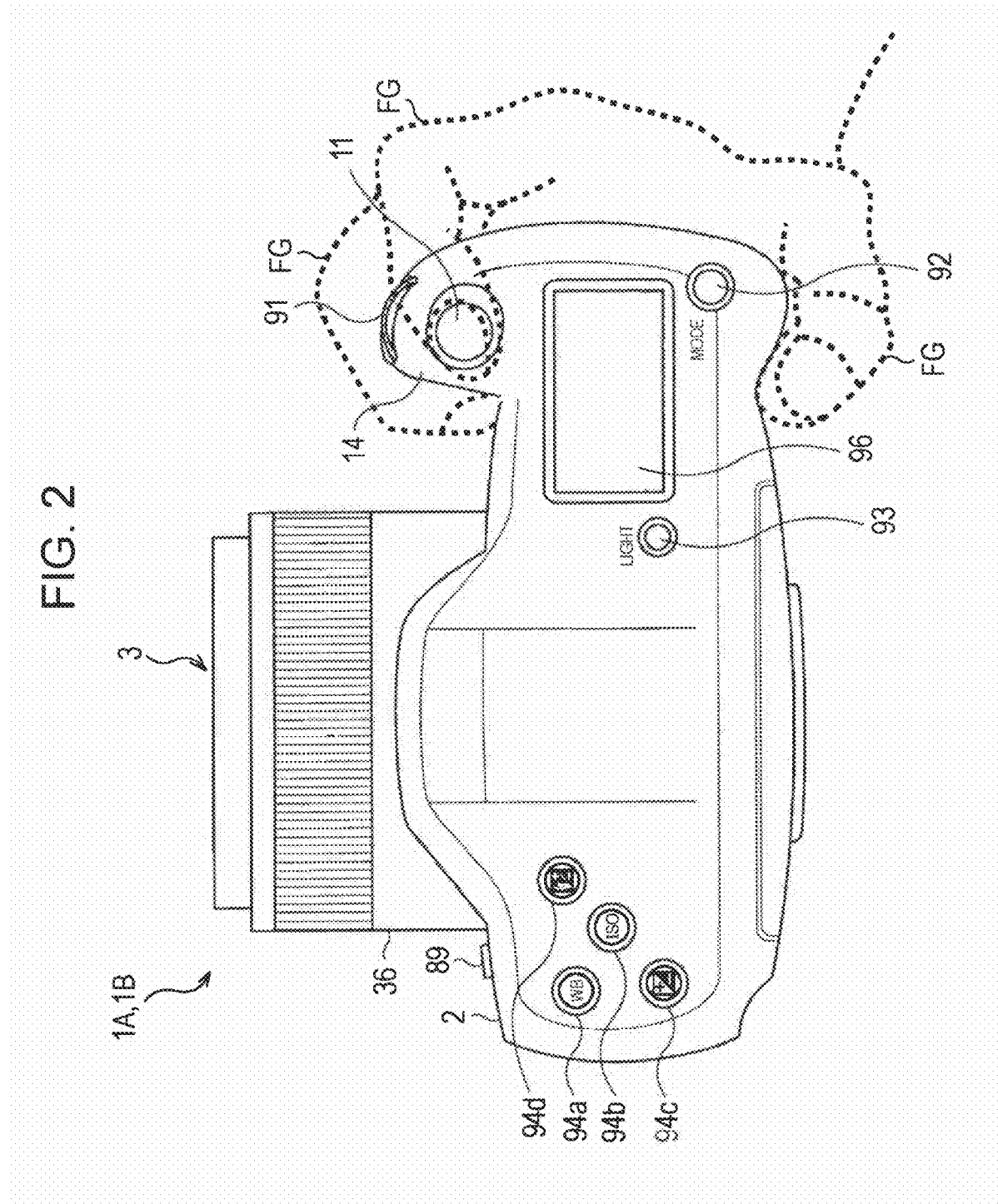
FIG. 2 is a rear external view of the image pickup apparatus.

FIGS. 1 and 2 illustrate external structures of an electronic device 1A according to a first embodiment of the present invention. FIG. 1 is a rear external view of the image pickup apparatus (horizontal orientation) 1A to which a vertical position control grip 7 is mounted, and FIG. 2 is a top external view of the image pickup apparatus 1A. The image pickup apparatus 1A is structured as an interchangeable lens system single-lens reflex type digital camera and functions as an electronic device. It should be noted that a finger FG of right hand used for image pickup in the horizontal orientation is also illustrated in FIG. 1.

As shown in FIG. 2, for example, the image pickup apparatus 1A includes a camera main body part (camera body) 2. Also, an interchangeable system image pickup lens unit (interchangeable lens) 3 can be detachably attached to the camera main body part 2.

The image pickup lens unit 3 is mainly composed of a camera cone 36, and the lens group 37 (refer to FIG. 4) and an aperture diaphragm which are provided inside the camera cone 36. The lens group 37 includes a focus lens for changing a focus position by moving a focus lens in a light axis direction, and other components.

The camera main body part 2 is provided with a circular mount unit to which the image pickup lens unit 3 is mounted on a front face substantially at the center and an attachment/detachment button 89 for attaching and detaching the image pickup lens unit 3 in the vicinity of the circular mount unit.

In addition, the camera main body part 2 is provided with a grip unit 14 on the front face in a far left part (on the right side viewed from the back face) for the user to grip. A shutter button 11 for instructing an exposure start or the like is provided on the top face on the front side of the grip unit 14. Inside the grip unit 14, a battery accommodating chamber and a card accommodating chamber are provided. In the battery accommodating chamber, for example, four AA batteries are accommodated as a power supply for the camera. In the card accommodating chamber, a memory card 90 for recording image data of a captured image (refer to FIG. 4) is detachably accommodated.

The shutter button 11 is composed of a two-stage detection button adapted to be able to detect two states including a half press state (S1 state) and a full press state (S2 state). When the shutter button 11 is half pressed to achieve the S1 state, a preparation operation for obtaining a still image for recording related to a subject (an image obtained by an actual image pickup) (for example, AF control operation, an AE control operation, etc.) is performed. Also, when the shutter button 11 is further pressed to achieve the S2 state, an image pickup operation for the actual image pickup is performed (a series of operations in which an image pickup element 5 (which will be described later) is used to perform an exposure operation related to a subject image and a predetermined image processing is performed on an image signal obtained by the exposure operation).

In FIG. 1, an optical finder 10 is provided in a substantially central upper part of the back face of the camera main body part 2. The subject image from the image pickup lens unit 3 is led to the optical finder 10. As the user looks through the optical finder 10, it is possible to visually recognize the subject. To be more specific, the subject image passing through the image pickup lens unit 3 is reflected by a mirror mechanism (refer to FIG. 4) upward, and an image through a pentaprism is viewed through an eyepiece. Thus, the subject image can be visually recognized. In this manner, it is possible to perform the frame setting by using the optical finder 10. It should be noted that at the time of the actual image pickup, the mirror mechanism is retracted from a light path of the subject image, and the light from the image pickup lens unit 3 reaches the image pickup element 5 in accordance with a release timing of a shutter 4 (refer to FIG. 4). Thus, the captured image (captured image data) related to the subject can be obtained.

A back face monitor 12 is provided substantially at the center on the back face of the camera main body part 2 (in more detail, at a position slightly on the left). The back face monitor 12 is constructed as, for example, a color liquid crystal display (LCD). The back face monitor 12 is a display unit capable of displaying a menu screen for setting an image pickup condition and the like and reproducing and displaying the captured image recorded in the memory card 90 in a reproduction (play) mode.

A main switch 81 is provided in a lower right part on the back face of the camera main body part 2, and in more detail, in a lower right part of the back face monitor 12. The main switch 81 is constructed as a lever system switch. When a lever part of the main switch 81 is set in an "OFF" position on the left, the power supply is turned OFF, and when a lever part of the main switch 81 is set in an "ON" position on the right, the power supply is turned ON.

A multi selector 83 is provided on the back face in an upper right part of the camera main body part 2, and in more detail, on the right side of the back face monitor 12. The multi selector 83 is a joy stick type operation member. The multi selector 83 can direct operations of inclining a stick part 83e in four directions of up, down, left, and right, and can also detect a press operation of the stick part 83e.

In addition, a backward side command dial 82, an AF/MF control button 84, an AE lock button 85, and a play button 86 are provided on the back face in an upper right part of the camera main body part 2, and in more detail, on the right side of the back face monitor 12 and also on the upper side of the multi selector 83.

The backward side command dial 82 is composed of a rotation system operation member. In accordance with the rotating operations, various setting contents can be changed.

The AF/MF control button 84 is a button for accepting a switching instruction between auto focus (AF) and manual focus (MF). In the image pickup state, each time this button 84 is pressed, the auto focus (AF) and the manual focus (MF) are sequentially changed.

The AE lock button 85 is a button for accepting an instruction of "AE lock" for locking the exposure state which has been adjusted by the auto exposure operation during the image pickup. The AE lock button 85 also functions as a "slow synchronism button" during image pickup with flash. In addition, the AE lock button 85 also functions as a "delete button" for accepting a deletion instruction to delete the reproduction target image during the reproduction.

The play button 86 is a button for accepting a change instruction into the reproduction mode. In other words, the play button 86 is a button to which a change instruction function into the reproduction mode (call function for the image reproduction mode) is assigned. In the image pickup mode, when the play button 86 is pressed, the image pickup apparatus 1A is shifted into the reproduction mode, where the captured image is displayed on the back face monitor 12.

In addition, three push button system custom keys (custom buttons) C1, C2, and C3 are arranged on the back face in a right side part of the camera main body part 2, and in more detail, on the right side of the back face monitor 12. The user can perform press operations of the custom keys. The respective custom keys C1 to C3 are composed of a hard key to which a function can be variably assigned by the user. In other words, the respective custom keys C1 to C3 are composed of operation members in which the assigned functions can be customized. These custom keys C1, C2, and C3 will be described later.

Moreover, a menu button 87, the function button 88a, a memory switching button 88b, the image quality adjustment button 88c, and the screen switching button 88d are provided on the back face in a left side part of the camera main body part 2, in more detail, on the left side of the back face monitor 12.

The menu button 87 is a button for realizing a display function (call function) of a menu screen. When the menu button 87 is pressed, the menu screen having a plurality of items for performing various settings is displayed on the back face monitor 12.

The function button 88a is a button for realizing a display function (call function) of displaying a sub menu screen related to a part of items among the plurality of items included in the menu screen on the back face monitor 12. For example, when the function button 88a is pressed during the image pickup, the menu screen for the image pickup is displayed on the back face monitor 12, and when the function button 88a is pressed during the reproduction, the menu screen for the image play is displayed on the back face monitor 12.

The memory switching button 88b is a button for switching recording media in which the captured image is recorded (memory cards and the like). In the image pickup apparatus 1A, it is possible to load memory cards of a plurality of types in predetermined positions in the image pickup apparatus 1A. With the press operation of the memory switching button 88b and the like, it is possible to previously set such a selection that which type of memory card is used as a recording target when memory cards of a plurality of types are loaded.

The image quality adjustment button 88c is a button for selectively set an image quality of a recorded image (standard, fine, PAW, and the like). The image quality of the recorded image is changed by switching the presence and the absence of a compression (a JPEG compression or the like) or switching a compression rate during a compression recording.

The screen switching button 88d is a button for switching whether image pickup information is overlapped and displayed on the reproduced image and switching a content of the image pickup information overlapped and displayed. For example, through the press of the screen switching button 88d, it is possible to selectively and cyclically switch a screen for only displaying the reproduced image, a screen for displaying character information on the reproduced image in an overlapping manner, and a screen for displaying a histogram related to luminance on the reproduced image in the overlapping manner.

Also, as illustrated in FIG. 2, a mode setting button 92, a light button 93, a white balance button 94a, an ISO sensitivity button 94b, an exposure correction button 94c, a dimming correction button 94d, and a liquid crystal display panel 96 are provided on the top face of the camera main body part 2. In addition, a forward side command dial 91 is provided on a forward side of the shutter button 11.

The forward side command dial 91 is composed of a rotation system operation member. It is possible to change various setting contents in accordance with a rotation operation of the forward side command dial 91.

The mode setting button 92 is an operation member adapted to perform a setting operation of various modes of the camera (switching operation). Each time the mode setting button 92 is pressed, the setting contents are sequentially (and cyclically) changed to decide the setting contents. Through such a press operation of the mode setting button 92, it is possible to select a desired mode from among various image pickup modes (to be more specific, a P mode (program mode), an A mode (aperture diaphragm priority mode), an S mode (shutter speed priority mode), an M mode (manual mode), a human image pickup mode, a scenery image pickup mode, a full auto image pickup mode, and the like).

The white balance button 94a is a button for performing a white balance adjustment, and the ISO sensitivity button 94b is a button for performing an ISO sensitivity adjustment. The exposure correction button 94c is a button for performing an exposure correction to correct brightness of the entire image, and the dimming correction button 94d is a button for performing an exposure correction to adjust the flash emitting amount.

The liquid crystal display panel 96 is a display unit adapted to display current various setting contents. ON and OFF of a back light of the liquid crystal display panel 96 is changed in accordance with a press operation of the light button 93.

Also, through an operation of the backward side command dial 82 or the forward side command dial 91, it is possible to set control values in various image pickup modes. For example, in the S mode (shutter speed priority mode), through the rotation operation of the forward side command dial 91, it is possible to set a desired shutter speed from among settable values in a plurality of stages. Furthermore, after the press of the ISO sensitivity button 94b, a desired value is selected from among the settable values in a plurality of stages by rotating the forward side command dial 91, and it is possible to set the ISO sensitivity value. In a similar manner, based on a combination of the white balance button 94a and the forward side command dial 91, a combination of the exposure correction button 94c and the forward side command dial 91, or a combination of the dimming correction button 94d and the forward side command dial 91, through a similar setting operation, the setting contents corresponding to the buttons can be decided. It should be noted that instead of the forward side command dial 91, it is possible to perform the similar setting operation by using the backward side command dial 82.

Also, contents of the functions fixedly assigned to the respective buttons are indicated in the vicinities of the above-mentioned respective buttons 84, 85, 86, 87, 88a to 88d, 92, 93, 94a to 94d, and the like or on the respective buttons themselves by way of characters, figures (marks), etc. These display contents are affixed on the corresponding parts of the camera main body part 2 through a serigraph processing or the like. For example, in a center part of the play button 86, a figure representing the reproduction function (call function of the reproduction mode) is marked by the serigraph. Also, n a center part of the menu button 87, four characters "MENU" are marked by the serigraph.

The vertical position control grip 7 functions as an auxiliary tool which is used when the image pickup apparatus 1A is used in the vertical orientation corresponding to a non-standard orientation of the image pickup apparatus 1A. The vertical position control grip 7 can be detachably attached to the image pickup apparatus 1A.

Figure 3:
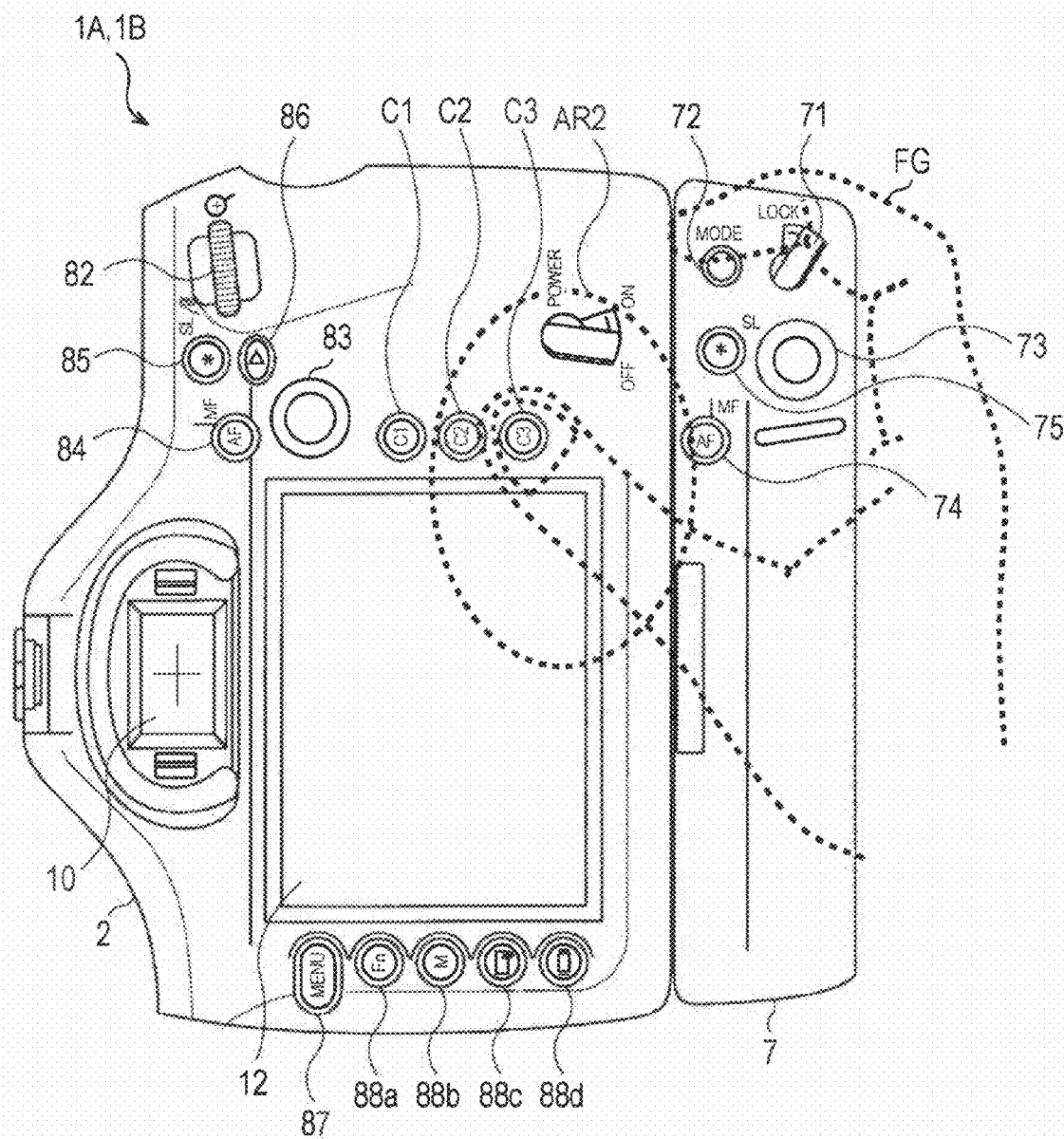
FIG. 3 is a rear external view of the image pickup apparatus (vertical orientation) to which the vertical position control grip is mounted.

FIG. 3 is a rear external view of the image pickup apparatus 1A to which the vertical position control grip 7 is mounted. FIG. 3 illustrates a use state of the image pickup apparatus 1A in the vertical orientation. Hereinafter, a description will be provided of a configuration of the vertical position control grip 7 with reference to FIG. 3.

The vertical position control grip 7 includes a shutter button 79 (not shown), a mode setting button 72, a multi selector 73, an AF/MF control button 74, and an AE lock button 75.

The shutter button 79 has a similar configuration to that of the shutter button 11. In the vertical orientation illustrated in FIG. 3, the shutter button 79 is provided at a position slightly lower than the top face of the vertical position control grip 7 (a position slightly entering into the left side from the right side face in the horizontal orientation in FIG. 1). The shutter button 79 is provided at a position on a forward side in the depth direction. In FIG. 3, positions of the respective fingers FG of the right hand in the image pickup in the vertical orientation are also illustrated. The shutter button 79 can input an image pickup start instruction or the like with a feeling similar to that for the shutter button 11 in the vertical orientation of the image pickup apparatus. In the image pickup in the vertical orientation according to this embodiment, it is supposed that the shutter button 79 is pressed by the index finger of the right hand.

In addition, the mode setting button 72, the multi selector 73, the AF/MF control button 74, and the AE lock button 75 respectively have similar configurations to those of the mode setting button 92 (refer to FIG. 2), the multi selector 83 (refer to FIG. 1), the AF/MF control button 84, and the AE lock button 85, and realize similar functions. These operation members 72 to 75 are arranged on the back face in the right part in the vertical orientation and have high operability.

Figure 4:
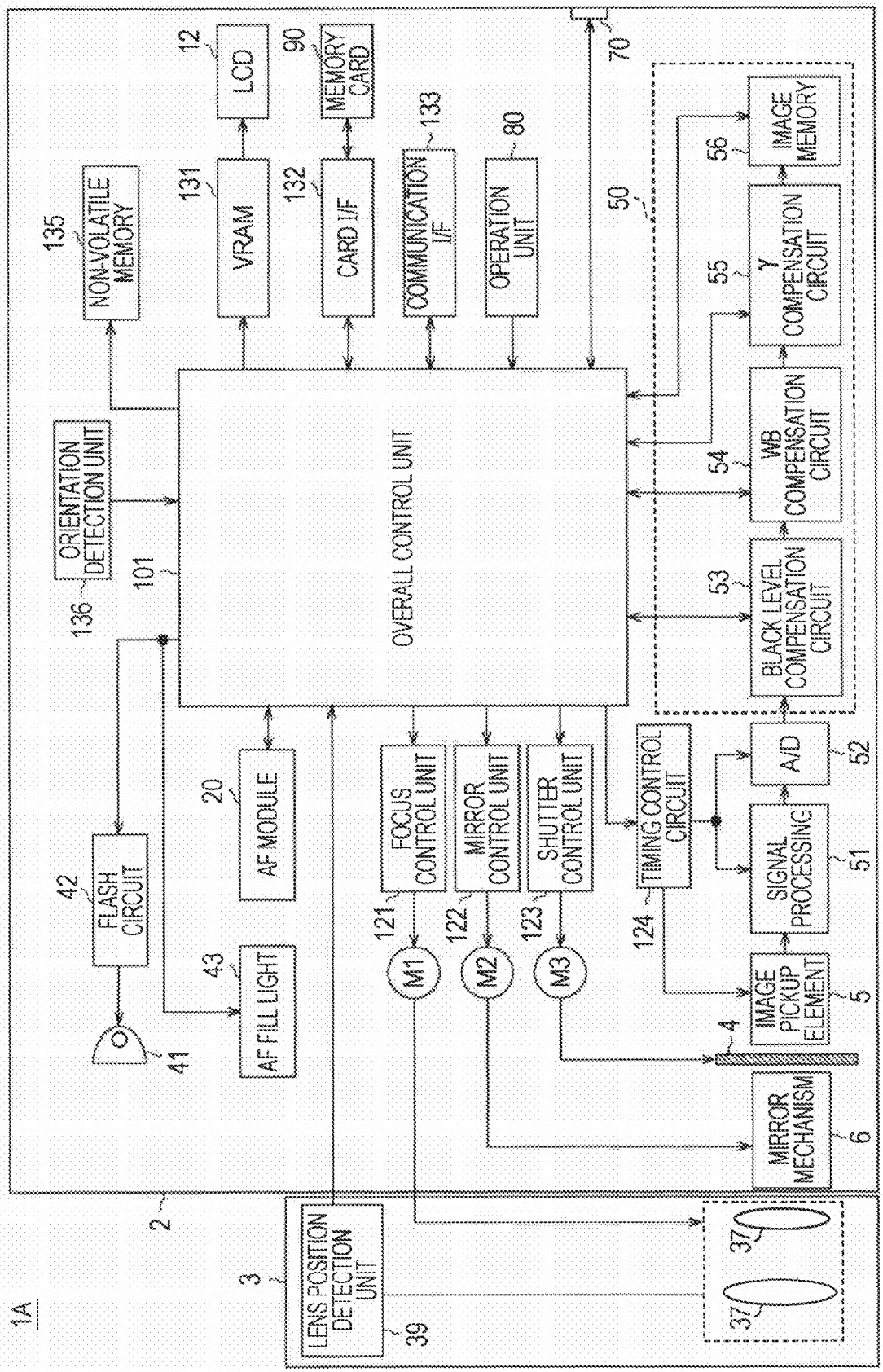
FIG. 4 is a block diagram of a function configuration of image pickup apparatus.

In a state where the vertical position control grip 7 is mounted to the camera main body part 2, the vertical position control grip 7 is electrically connected with the camera main body part 2, press states or the like of various operation members 72 to 75 are transmitted to 1 overall control unit 101 (refer to FIG. 4). Thus, during the image pickup in the vertical orientation, as the user operates the respective operation members 72, 73, 74, 75, and 79, it is possible to realize similar functions to those realized by operating the corresponding operation members 92, 83, 84, 85, and 11.

Next, with reference to FIG. 4, a function block of the image pickup apparatus 1A will be described. FIG. 4 is a function block of a function configuration of the image pickup apparatus 1A. It should be noted that in a case where the vertical position control grip 7 is mounted to the image pickup apparatus 1A, information transmission is performed between the image pickup apparatus 1A and the vertical position control grip 7 via an electrical contact (for example, a connector) 70.

As illustrated in FIG. 4, the image pickup apparatus 1A is provided with an operation unit 80, the overall control unit 101, a focus control unit 121, a mirror control unit 122, a shutter control unit 123, a timing control circuit 124, a digital signal processing circuit 50, and the like.

The operation unit 80 is structured by having various buttons including the shutter button 11 (refer to FIG. 2), switches, and the like. In response to an input operation to the operation unit 80 by the user, the overall control unit 101 realizes various operations.

The overall control unit 101 is composed as a micro computer and mainly provided with a CPU, a memory, a ROM, etc. The overall control unit 101 is adapted to read a program stored in the ROM and causes the CPU to execute the program, thus realizing various functions. For example, the overall control unit 101 is operated in cooperation with an AF module 20, the focus control unit 121, and the like to perform a focusing control operation for controlling a position of a focus lens. In accordance with a focusing state of the subject detected by the AF module 20, the overall control unit 101 uses the focus control unit 121 to realize an AF operation. It should be noted that by using the light entering via the mirror mechanism, the AF module 20 can detect the focusing state of the subject through a focusing state detection method such as a phase-contrast method.

The focus control unit 121 is adapted to move a focus lens included in the lens group 37 of the image pickup lens unit 3 by generating a control signal based on a signal input from the overall control unit 101 and driving a motor M1. Also, a position of the focus lens is detected by a lens position detection unit 39 of the image pickup lens unit 3. Data indicating the position of the focus lens is sent to the overall control unit 101. In this manner, the focus control unit 121, the overall control unit 101, and the like control the movement of the focus lens in the optical axis direction.

The mirror control unit 122 is adapted to control a state switching between a state where the mirror mechanism is retracted from the optical path (mirror up state) and a state where the mirror mechanism blocks the optical path (mirror down state). The mirror control unit 122 switches the mirror up state and the mirror down state by generating a control signal based on a signal input from the overall control unit 101 and driving a motor M2.

The shutter control unit 123 is adapted to control opening and closing of the shutter 4 by generating a control signal based on a signal input from the overall control unit 101 and driving a motor M3.

The timing control circuit 124 is adapted to perform a timing control with respect to the image pickup element 5 and the like.

The image pickup element (for example, a CMOS sensor) 5 is adapted to convert an optical image of the subject into an electrical signal based on a photoelectric conversion effect and generate an image signal related to the captured image. In response to drive control signals (an accumulation start signal and an accumulation end signal) input from the timing control circuit 124, the image pickup element 5 is adapted to perform exposure of the subject image formed on an acceptance surface (charge accumulation through photoelectric conversion) and generate an image signal related to the subject image. Also, in response to a reading control signal input from the timing control circuit 124, the image pickup element 5 outputs the image signal to a signal processing unit 51. Also, the timing signal (synchronism signal) from the timing control circuit 124 is also input to the signal processing unit 51 and an A/D (analog/digital) conversion circuit 52.

The image signal obtained in the image pickup element 5 is subjected to a predetermined analog signal processing in the signal processing unit 51. The image signal after the analog signal processing is converted into digital image data (image data) by the A/D conversion circuit 52. This image data is input to the digital signal processing circuit 50.

The digital signal processing circuit 50 performs a digital signal processing on the image data input from the A/D conversion circuit 52 to generate image data related to the captured image. The digital signal processing circuit 50 is provided with a black level correction circuit 53, a white balance (WB) circuit 54, a γ correction circuit 55, and an image memory 56.

The black level correction circuit 53 is adapted to correct a block level of each pixel data constituting the image data which is output from the A/D conversion circuit 52 to a reference block level. The WB circuit 54 is adapted to perform the white balance adjustment on the image. The γ correction circuit 55 is adapted to perform a tone conversion of the captured image. The image memory 56 is composed of an image memory for temporarily store the generated image data in which a high speed access can be performed. The image memory 56 has a capacity sufficient to be able to store image data for a plurality of frames.

During the actual image pickup, the image data temporarily stored in the image memory 56 is stored in the memory card 90 via a card I/F 132 by the overall control unit 101.

Also, the image data temporarily stored in the image memory 56 is appropriately transferred to a VRAM 131 by the overall control unit 101, and the image based on the image data is displayed on the back face monitor 12. With this configuration, the check display (after view) for checking the captured image, the reproduction display for reproducing the captured image, and the like are realized.

Furthermore, the image pickup apparatus 1A include a communication I/F 133 and can perform data communication with a device at a connection target of the interface 133 (for example, a personal computer, etc.).

Also, the image pickup apparatus 1A is provided with a flash 41, a flash control circuit 42, and an AF fill light emitting unit 43. The flash 41 is a light source used when the luminance of the subject is not sufficient, for example. The flash control circuit 42, the overall control unit 101, and the like control the presence or absence of lighting, the lighting time, etc., of the flash 41. The AF fill light emitting unit 43 is composed of a fill light source for the AF. The presence or absence of lighting, the lighting time, etc., of the AF fill light emitting unit 43 are controlled by the overall control unit 101, and the like.

In addition, the image pickup apparatus 1A is provided with an orientation detection unit 136 for detecting the orientation of the image pickup apparatus 1A. The orientation detection unit 136 includes, for example, an orientation detection sensor structured as a mercury switch, a gravity sensor, an acceleration sensor, or the like. Based on the detection result in the orientation detection unit 136, the overall control unit 101 obtains orientation information as to whether the orientation is the horizontal orientation (FIG. 1) corresponding to the standard orientation when the image pickup apparatus 1A is used or the vertical orientation corresponding to the non-standard orientation (FIG. 3) when the image pickup apparatus 1A is used.

Furthermore, the image pickup apparatus 1A is provided with a non-volatile memory 135. The non-volatile memory 135 stores various setting contents (for example, function contents set to the custom keys C1 to C3 which will be described later) and the like in the image pickup apparatus 1A.

Regarding Custom Key Arrangement

Next, a description will be provided of an arrangement of the custom keys C1, C2, and C3 (refer to FIG. 1). As described above, the respective custom keys C1 to C3 are the operation members in which the assigned functions can be customized.

As illustrated in FIG. 1, the respective custom keys C1 to C3 are arranged on the back face in a right area of the image pickup apparatus 1A. In more detail, the respective custom keys C1, C2, and C3 are arranged in an area of the back face in the right area except a right periphery part (for example, a far right ¼ area of the back face in the right area). Also, the respective custom keys C1 to C3 are arranged in an area of the back face in the right area except an upper periphery part (for example, a ¼ area at the upper end of the back face in the right area). Therefore, the respective custom keys C1 to C3 are arranged in the area of the back face in the right area except the right periphery part and the upper periphery part.

Also, as illustrated in FIG. 1, the respective custom keys C1 to C3 are arranged on the right side of the back face monitor 12, and in more detail, are arranged in the vicinities on the right side of the back face monitor 12.

Herein, when the user performs the image pickup in the horizontal orientation, which is an orientation relatively horizontal to a bottom face of the image pickup apparatus 1A (standard orientation), the user touches the shutter button 11 provided on the right side of the user the image pickup apparatus 1A with the right index finger and grips the main body of the image pickup apparatus 1A (to be specific, the right side part thereof (the grip unit 14, etc.)) with the right hand to decide the frame in many cases. It should be noted that in the present specification, in principle, left, right, up, and down are defined with the standard orientation (refer to FIG. 1) as the reference.

In FIGS. 1 and 2, the positions of the right hand finger FG and the like are also illustrated. In FIG. 1, etc., in the image pickup in the standard orientation of the image pickup apparatus 1A, the position of the right hand thumb which presses the play button 86 in the mid-course of the image pickup is illustrated. It should be noted that in the image pickup in the standard orientation of the image pickup apparatus 1A, at a moment when the shutter button 11 is pressed, the right hand thumb may exist at the position illustrated in FIG. 1, but from such a viewpoint that an erroneous operation is prevented, the right hand thumb preferably exists at a position slightly lower than the position illustrated in FIG. 1 (for example, immediately next to the custom key C1 on the right and in the vicinity immediately below the play button 86).

For performing such an image pickup in the standard orientation, as the respective custom keys C1 to C3 are arranged within the back face in the right area of the image pickup apparatus 1A, the respective custom keys C1 to C3 are satisfactorily operated by the right hand finger (in particular, the right hand thumb). In particular, the respective custom keys C1 to C3 are arranged in the vicinities on the right side of the back face monitor 12, and thus the operability for the right hand thumb is extremely satisfactory.

In addition, it can be also described that the respective custom keys C1 to C3 are arranged in a range where the operations on the target operation members can be performed by the right hand thumb while moving the joint of the right hand thumb without substantially changing the grip state of parts other than the right hand thumb (at least one of the first joint, the second joint, and the third joint) (hereinafter also referred to as "excellent operability area" in the standard orientation or "prime area") during the image pickup in the standard orientation of the image pickup apparatus 1A when the user grips the image pickup apparatus 1A in the standard orientation with the right hand. The "excellent operability area" in the standard orientation is represented as an ellipse area AR1, which is surrounded by a broken line, for example, in FIG. 1. Also, a position and a size of this "excellent operability area" are determined, for example, with the size of the hand fingers for an average adult male as the reference.

Thus, the user can perform the press operations on the respective custom keys C1 to C3 without releasing the grip state by the right hand (in more detail, the palm) and also without hardly shifting the grip part for the right hand, by moving the right hand thumb alone, and it is possible to obtain the extremely high operability. That is, by moving the right hand thumb to the position of the desired custom key, the user can press the custom key without substantially changing the grip state of the image pickup apparatus 1A by the right hand, and it is possible to obtain the high operability. It should be noted that such a high operability can be obtained also in a case where the image pickup apparatus 1A is gripped by only using the right hand (that is, one hand) as well as a case where the image pickup apparatus 1A is gripped by using both the right hand and the left hand (that is, both hands).

Then, functions of other operation members 84, 85, 86, 87, 88a to 88d, 92, 93, 94a to 94d, and the like can be assigned to the respective custom keys C1, C2, and C3 having such a high operability. For example, it is possible to assign the function of the function button 88a to the custom key C1, assign the function of the ISO sensitivity button 94b to the custom key C2, and/or assign the function of the play button 86 to the custom key C3.

Therefore, through the operations on the custom keys C1 to C3 which are arranged in the range where a particular finger (for example, the thumb) of the right hand griping the image pickup apparatus 1A in the horizontal orientation (standard orientation) reaches, it is possible to realize the functions assigned to the custom keys. As a result, it is possible for the user to obtain the extremely satisfactory operational feeling.

Also, in the above description, the case where the respective custom keys C1 to C3 are arranged in the "excellent operability area" has been exemplified, but the embodiment of the present invention is not limited to this case.

For example, the custom keys C1 to C3 may be arranged in an "intermediate operability area" which will be described next. With this configuration also, it is possible to obtain a high operability.

Herein, the "intermediate operability area" in the standard orientation means a range (area) where the operation on the target operation member by the right hand thumb can be performed when the user grips the image pickup apparatus 1A in the standard orientation with the right hand if the grip state is substantially changed by shifting the grip position/grip angle of the grip part other than the right hand thumb. In other words, the "intermediate operability area" in the standard orientation is also described as an area where the grip state of the fingers of the right hand other than the right hand thumb substantially should be changed in order to operate the target operation member by the right hand thumb when the user grips the image pickup apparatus in the standard orientation with the right hand. It should be noted that the above-mentioned the back face in the right area is also described as an area including a part or an entity of such an "intermediate operability area" and the above-mentioned "excellent operability area".

In contrast, it is also conceivable to arrange the custom keys C1 to C3 in a "low operability area (which will be described next)" in the standard orientation. For example, it is also conceivable to arrange the custom keys C1 to C3 in the vicinities on the left side of the back face monitor 12.

Herein, the "low operability area" in the standard orientation means a range (area) where the grip state substantially should be released, for example, while the right hand (in more detail, larger than almost all the area of the palm) is removed from the image pickup apparatus 1A in order to operate the target operation member by the right hand thumb when the user grips the image pickup apparatus 1A in the standard orientation with the right hand. This "low operability area" is also referred to as "second-rate area". It should be noted that the above-mentioned "intermediate operability area" is an area having an intermediate operability between "low operability area (second-rate area)" and the above-mentioned "excellent operability area (prime area)" and therefore the "intermediate operability area" is also referred to as "semiprime area".

However, in order to obtain a higher operability, instead of arranging the custom keys C1, C2, and C3 in such a "low operability area (second-rate area)", it is preferable to arrange the custom keys C1, C2, and C3 in "intermediate operability area (semiprime area)". Also, in order to obtain still higher operability, it is particularly preferable to arrange the custom keys C1, C2, and C3 in the "excellent operability area (prime area)".

In the above, the description has been provided of the operability in the case where the image pickup operation is performed in the horizontal orientation in which the bottom face of the image pickup apparatus 1A is somewhat relatively horizontal to the ground.

Next, a description has been provided of the operability in the case where the image pickup operation is performed in the vertical orientation (refer to FIG. 3) in which the bottom face of the image pickup apparatus 1A is somewhat relatively vertical to the ground.

The custom keys C2 and C3 are arranged in an ellipse area AR2 during the image pickup in the vertical orientation illustrated in FIG. 3. In other words, the custom keys C2 and C3 are arranged in the "excellent operability area" in the vertical orientation (which will be described next). Therefore, during the image pickup in the vertical orientation as well, the extremely high operability through the operations on the custom keys C2 and C3 can be obtained. Herein, the "excellent operability area" in the vertical orientation (which is also referred to as "prime area") means a range where the operations on the target operation members can be performed by the right hand thumb while moving the joint of the right hand thumb without substantially changing the grip state of parts other than the right hand thumb (at least one of the first joint, the second joint, and the third joint) during image pickup in the vertical orientation of the image pickup apparatus 1A when the user grips the image pickup apparatus 1A in the vertical orientation with the right hand.

Therefore, the custom keys C2 and C3 are arranged in a product area of the "excellent operability area" in the standard orientation (horizontal orientation) (for example, the area AR1 of FIG. 1) and the "excellent operability area" in the vertical orientation (for example, the area AR2 of FIG. 3) (that is, the AND area or the overlapping area). Thus, the custom keys C2 and C3 can be operated with the extremely satisfactory operability in either orientation.

Also, the custom key C1 is arranged in the "intermediate operability area" (which is also referred to as "semiprime area") in the vertical orientation. Therefore, during the image pickup in the vertical orientation as well, it is possible to perform the satisfactory operation by using the custom key C1. It should be noted that the "intermediate operability area" in the vertical orientation means a range (area) where the operation on the target operation member by the right hand thumb can be performed when the user grips the image pickup apparatus 1A in the vertical orientation with the right hand if the grip state is substantially changed by shifting the grip position and/or the grip angle of the grip part other than the right hand thumb.

As described above, the respective custom keys C1 to C3 are arranged in a range where a particular finger of the right hand (for example, the thumb) griping the image pickup apparatus 1A to which the vertical position control grip 7 is mounted in the vertical orientation reaches. With this configuration, while the image pickup apparatus 1A in the vertical orientation is gripped with the right hand, the shutter button 79 of the vertical position control grip 7 can be operated by a right hand finger (for example, the index finger), and also it is possible for the user to easily operate the custom keys C1 to C3 to which the desired functions are assigned with a right hand finger (for example, the thumb). As a result, the operability improvement in the vertical orientation can be further enhanced.

Also, the custom keys C2 and C3 are arranged in the right area in the vertical orientation of FIG. 3 during such image pickup in the vertical orientation (that is, a right half area on the side close to the shutter button 79). In this manner, the custom keys are preferably arranged in the product area of the back face in the right area in the horizontal orientation and the back face in the right area in the vertical orientation. With this configuration, it is possible to operate the custom keys in either orientation with the satisfactory operability.

Incidentally, in the horizontal orientation of the image pickup apparatus 1A, the play button 86 is arranged on the back face in the upper right area, and the play button 86 itself is arranged in the area where the operation is extremely easily performed (in more detail, arranged in the "excellent operability area (prime area)" in the standard orientation (horizontal orientation)). Therefore, when the image pickup is performed in the horizontal orientation of the image pickup apparatus 1A, by using the play button 86, the user can execute the change instruction function into the reproduction mode with the extremely high operability.

However, in the vertical orientation of the image pickup apparatus 1A, the play button 86 is located in the far left area (refer to FIG. 3), and therefore the operability at the time of operating the play button 86 with the right thumb is not satisfactory. It should be noted that the "low operability area" in the vertical orientation means an area where the grip state substantially should be released, for example, while the right hand (in more detail, larger than almost all the area of the palm) is removed from the image pickup apparatus in order to operate the target operation member by the right hand thumb when the user grips the image pickup apparatus in the vertical orientation with the right hand.

In contrast, the custom keys C2 and C3 exist in the range where the satisfactory operability with the right thumb can be obtained (for example, "excellent operability area (prime area)") even in the vertical orientation.

Therefore, if the function of the play button 86 is assigned to the custom key C2 (or the custom key C3), during image pickup in the vertical orientation of the image pickup apparatus 1A, the user can execute the change instruction function into the reproduction mode by using the custom key C2 (or the custom key C3).

In this manner, it is possible to assign the function of the play button 86 existing in the "excellent operability area (prime area)" in the horizontal orientation to the custom key C2 (or the custom key C3) existing in the "excellent operability area (prime area)" in the vertical orientation. Then, in this case, the operation is performed while the play button 86 is used in the horizontal orientation and the operation is performed while the custom key C2 (or the custom key C3) is used in the vertical orientation. Thus, it is possible to obtain the high operability in both the horizontal orientation and the vertical orientation. In particular, even in a case where the play button 86 does not exist in the "excellent operability area (prime area)" in the vertical orientation, by performing the operation with use of the custom key C2 (or the custom key C3) in the vertical orientation, it is possible to obtain the extremely high operability even in the vertical orientation.

The function assignment to the respective custom keys C1 to C3 arranged in the above-mentioned manner will be described below.

Regarding Overlapping Function Assignment to Custom Key

The image pickup apparatus 1A is constructed in such a manner that functions fixedly assigned to other operation members of the image pickup apparatus 1A can be assigned to the respective custom keys C1 to C3 in an overlapping manner. The other operation member (that is, an operation member to which a function is fixedly assigned in which it may be difficult to customize the assigned function) is also referred to as function fixed operation member N1. The above-mentioned various buttons 84, 85, 86, 87, 88a to 88d, 92, 93, 94a to 94d, and the like for the settings are exemplified as function fixed operation member N1.

For example, the function assigned to the play button 86 (that is, the change instruction function into the reproduction mode) remains to be assigned to the play button 86 (in other words, without invalidating the assignment to the play button 86) and can also be assigned to the custom key C3. That is, the function fixedly assigned to the play button 86 can be assigned to the custom key C3 in the overlapping manner.

Then, in a case where the function of the play button 86 is also assigned to the custom key C3, as an operation for performing the change instruction into the reproduction mode, either the press operation of the play button 86 or the press operation of the custom key C3 can be used. Therefore, in order to realize the change instruction function into the reproduction mode with a simply operation, the custom key C3 is not necessarily used and appropriately the play button 86 (function fixed operation member N1) can also be used. In this case, an operational arbitrary property is high, which is convenient for the user. For example, when a memory of the user about the assigned content to the custom key C3 is vague and the user has a hesitation or the like, it is possible to call the function by using the play button 86. In particular, as a figure representing the function of the button is indicated on the play button 86, the function is easily visually recognized.

Also, the image pickup apparatus 1A is constructed in such a manner that a plurality of functions can be assigned to the respective custom keys C1 to C3. To be more specific, it is possible to assign different functions to the respective custom keys C1 to C3 in the horizontal and vertical orientations of the image pickup apparatus 1A. Hereinafter, a description will be provided of an operation of the image pickup apparatus 1A related to this function assignment.

Figure 5:
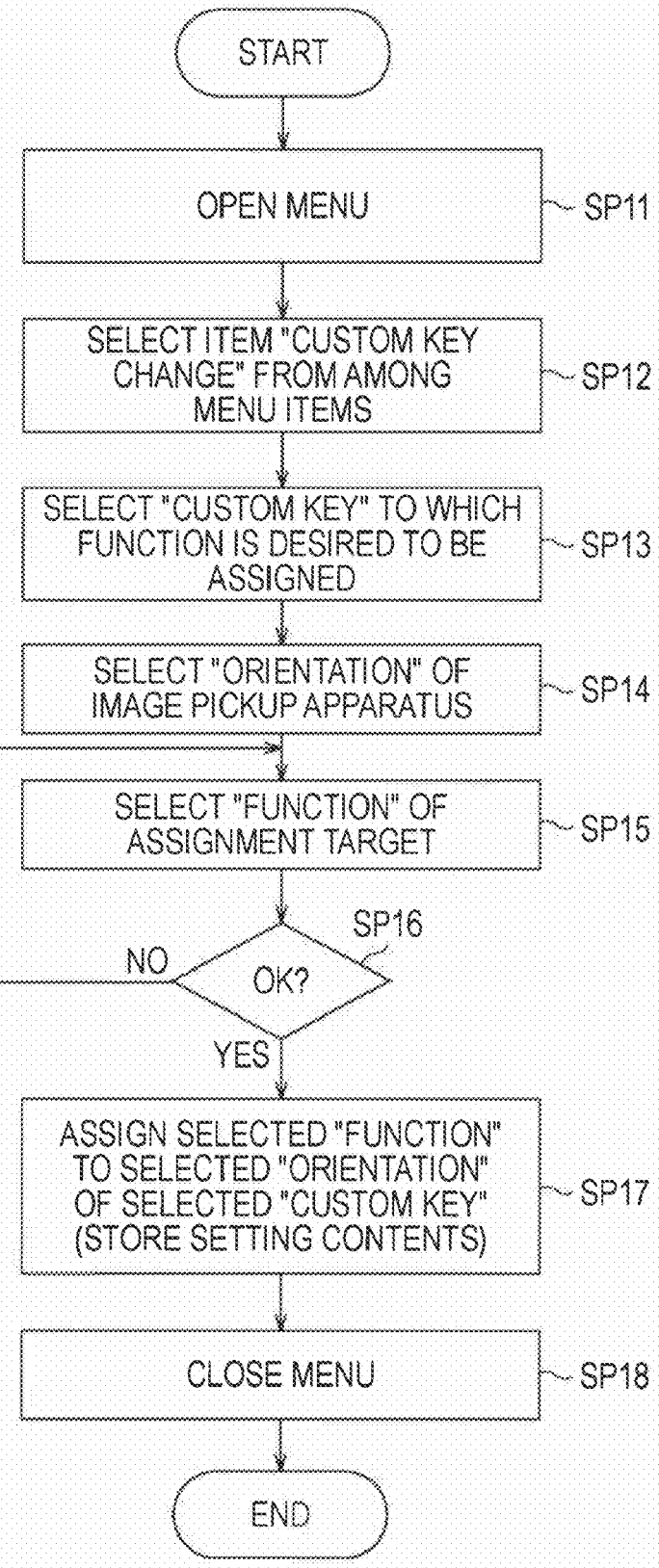
FIG. 5 is a flowchart for a setting change operation of assigned functions to custom keys C1 to C3.
Figure 6:
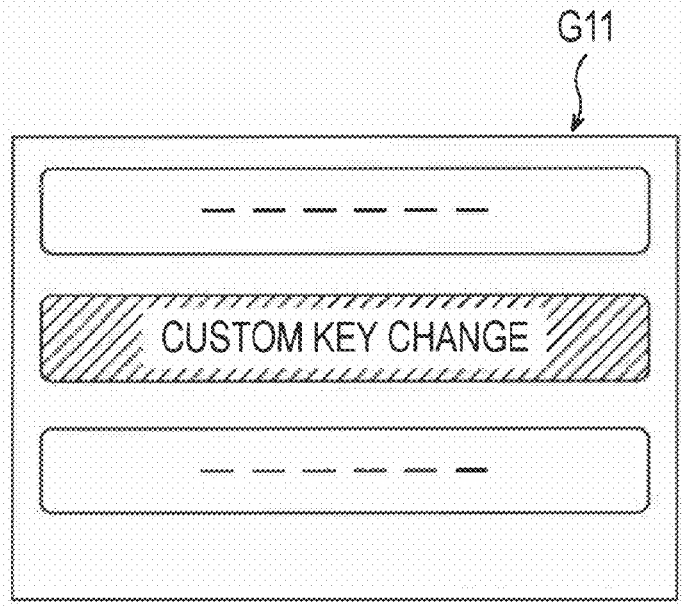
FIG. 6 illustrates a display screen of a back face monitor.

FIG. 5 is a flowchart for a setting change operation related to the assigned functions to the custom keys C1 to C3, and FIGS. 6 to 11 illustrate various screens G11 to G16 displayed on the back face monitor 12. With reference to these drawings, the setting change operation will be described. Herein, a case in which the "play key" is assigned to the "custom key C3" in the vertical orientation will be exemplified but the same applies to other assignment operations.

First, when the user presses the menu button 87, the image pickup apparatus 1A displays a menu screen G11 (FIG. 6) on the back face monitor 12 (Step SP11).

Figure 7:
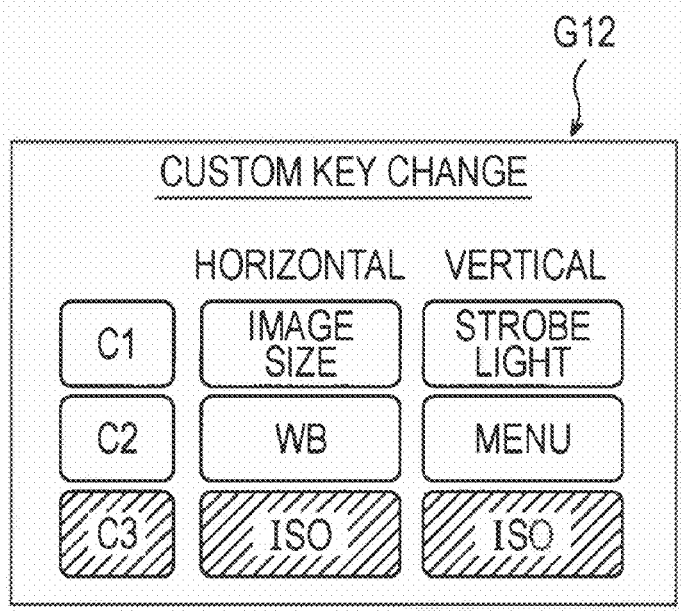
FIG. 7 illustrates another display screen of the back face monitor.
Figure 8:
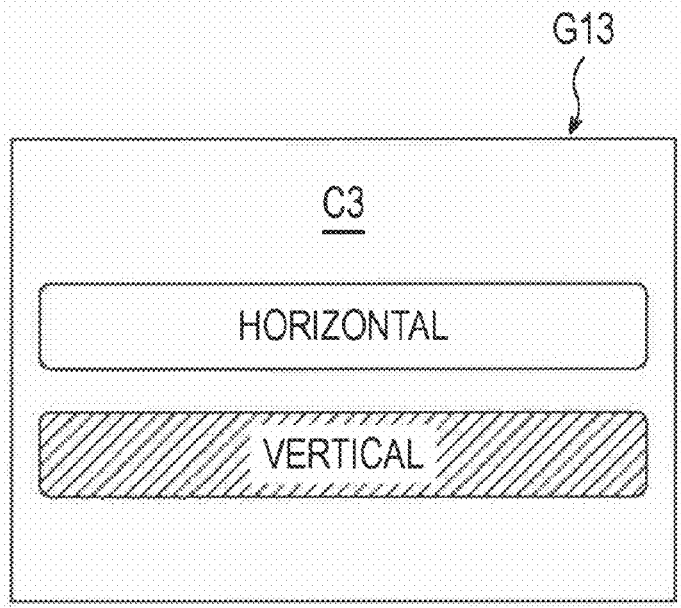
FIG. 8 illustrates another display screen of the back face monitor.
Figure 9:
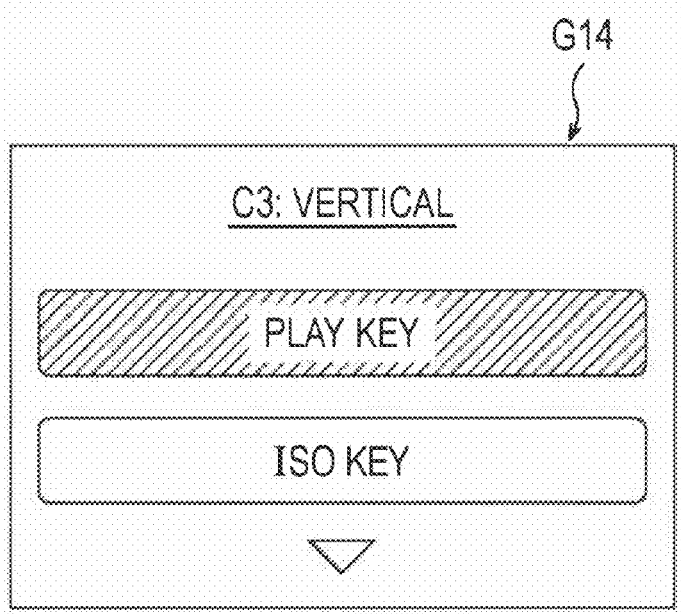
FIG. 9 illustrates another display screen of the back face monitor.
Figure 10:
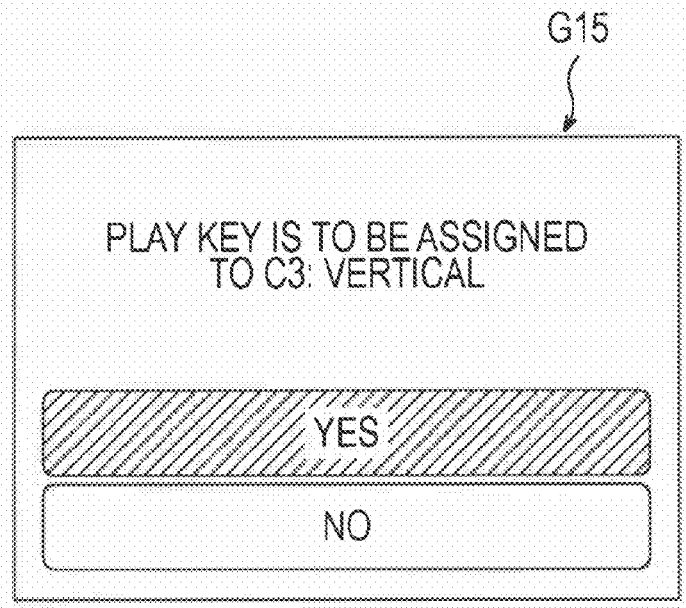
FIG. 10 illustrates another display screen of the back face monitor.

After that, when the user selects a desired option, that is, a "custom key change", from among a plurality of options (Step SP12), the image pickup apparatus 1A assumes an instruction input is performed so that the "custom key change" should be performed, and displays a screen G12 on the back face monitor 12 (FIG. 7).

A current assignment state is indicated the screen G12. In more detail, for each of the three custom keys C1 to C3, the contents assigned to the horizontal orientation of the image pickup apparatus 1A and the contents assigned to the vertical orientation of the image pickup apparatus 1A are indicated. In FIG. 7, regarding the custom key C1, an "image size" is assigned for the horizontal orientation, and a "strobe light" is assigned for the vertical orientation. Also, regarding the custom key C2, a "WB" is assigned for the horizontal orientation, and a "menu" is assigned for the vertical orientation. Then, regarding the custom key C3, an "ISO" is both assigned for the horizontal orientation and the vertical orientation.

Next, the user selects a change target (customization target) custom key (herein, the custom key C3) from among the options displayed within the screen G12 by using the multi selector 83 (Step SP13). In response to the selection operation, the image pickup apparatus 1A identifies the custom key selected as the change target, and thereafter displays a screen G13 for selecting an "orientation" of the image pickup apparatus which becomes the change target (FIG. 8) on the back face monitor 12.

The user uses the multi selector 83 to select the "orientation" of the image pickup apparatus which becomes the change target (herein, "vertical") from among the options displayed on the screen G13 (Step SP14). In response to the selection operation, the image pickup apparatus 1A identifies the orientation selected as the change target, and thereafter displays a screen G14 for display a list of assignable functions (FIG. 9) on the back face monitor 12. It should be noted that this list display can adopt such a display mode as a pull down system or a radio button system, for example.

The user uses the multi selector 83 to select the function that should be assigned from among the options displayed on the screen G14 (Step SP15).

In response to this selection operation, the image pickup apparatus 1A identifies the function selected by the user as the assignment target and displays a screen G15 for confirming the selected contents (FIG. 10) (Step SP16). On the screen G15 of FIG. 10, a message for asking the user to confirm whether the setting contents "the play key is to be assigned to the custom key C3 in the vertical orientation" are correct is displayed.

When the user performs an input to indicate the setting contents are not correct, the flow is returned to Step SP15, where the processing is shifted to a re-selection operation of the assigned function. On the other hand, when the user performs an input to indicate the setting contents are correct, the flow is advanced to Step SP17.

In Step SP17, the image pickup apparatus 1A stores new setting contents so that for the custom key selected in Step SP13, the function selected in Step SP15 is to be assigned to the orientation of the image pickup apparatus 1A selected in Step SP14. In more detail, the setting contents stored in the non-volatile memory 135 is overwritten by the new setting contents to update the setting contents. In other words, the non-volatile memory 135 stores information on the function in the horizontal orientation currently set in the custom key as the assigned function (the first function) and function in the vertical orientation (the second function). After that, the image pickup apparatus 1A finishes the "custom key change" operation, and the back face monitor 12 is returned to the display state before the press of the menu button 87 (Step SP18).

Figure 11:
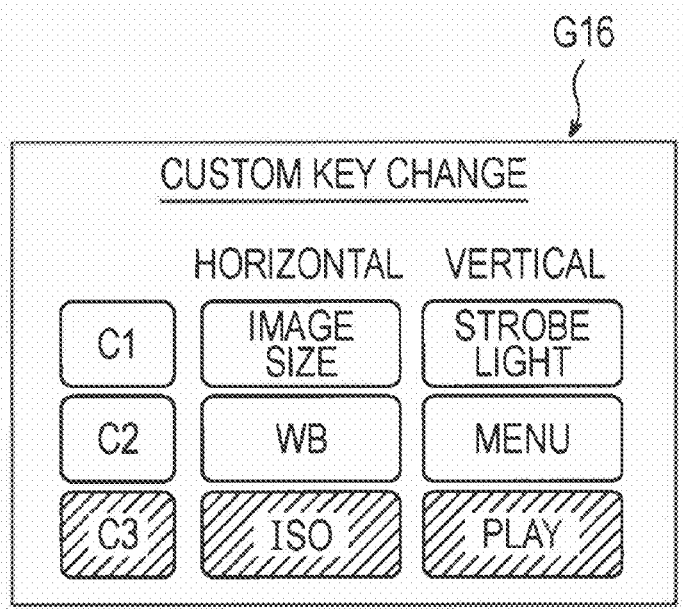
FIG. 11 illustrates another display screen of the back face monitor.

When the above-mentioned setting change operation is finished, the custom key assigned contents are changed as indicated on a screen G16 of FIG. 11. After the setting change, based on the new assigned contents, in response to the press on the respective custom keys C1 to C3, the function corresponding to the pressed key and the orientation of the image pickup apparatus 1A (the horizontal orientation or the vertical orientation) at the time of the key press is executed.

An operation of the image pickup apparatus 1A in which the two functions are set as described above in the respective custom keys C1 to C3 will be described below.

Operation of the Image Pickup Apparatus 1A

FIG. 12 is a flowchart for a basic operation of the image pickup apparatus 1A. The present operation is executed by the overall control unit 101 of the image pickup apparatus 1A.

First, when the user operates the main switch 81 to turn the power supply ON, a processing for activating the image pickup apparatus 1A (initialization processing) is performed (Step ST11).

In Step ST12, it is determined whether the image pickup mode is set. That is, in accordance with the orientation of the image pickup apparatus 1A, it is determined whether the image pickup mode in which the assigned functions to the custom keys C1 to C3 should be changed is selected or other mode (for example, the reproduction mode in which the orientation detection may not be performed) is selected. Herein, in a case where the image pickup mode is selected, the flow is advanced to Step ST13, and in a case where the image pickup mode is not selected, the present flow is ended.

In Step ST13, it is determined whether the image pickup apparatus 1A is in the vertical orientation. That is, the orientation detection unit 136 detects the orientation of the image pickup apparatus 1A to determine whether the orientation is the vertical orientation. Herein, in a case where the orientation is the vertical orientation, the flow is advanced to Step ST14, and in a case where the orientation is not the vertical orientation but is the horizontal orientation, the flow is advanced to Step ST15.

In Step ST14, a processing for assigning the functions to the respective custom keys C1 to C3 in the vertical orientation is performed. For example, in a case where the function setting illustrated in FIG. 11 is performed, the respective functions of the "strobe light", the "menu", and the "play" stored in the non-volatile memory 135 are assigned to the custom keys C1 to C3.

In Step ST15, a processing for assigning the functions to the respective custom keys C1 to C3 in the horizontal orientation is performed. For example, in a case where the function setting illustrated in FIG. 11 is performed, the respective functions of the "image size", the "WB", the "ISO" stored in the non-volatile memory 135 are assigned to the custom keys C1 to C3.

In this manner, in Steps ST14 and ST15, when it is determined that the image pickup apparatus 1A is in the horizontal orientation based on the detection result of the orientation detection unit 136, the function stored in the non-volatile memory 135 in the horizontal orientation (the first function) is assigned to the respective custom keys C1 to C3. On the other hand, when it is determined that the image pickup apparatus 1A is in the vertical orientation based on the detection result of the orientation detection unit 136, the function stored in the non-volatile memory 135 in the vertical orientation (the second function) is assigned to the respective custom keys C1 to C3. With this configuration, the operability of the image pickup apparatus 1A in the respective orientations is still further improved.

With the above-mentioned operation of the image pickup apparatus 1A, the respective custom keys C1 to C3 are arranged in the range where the finger of the right hand griping the image pickup apparatus 1A to which the vertical position control grip 7 is mounted in the vertical orientation reaches, the assigned function is switched in accordance with the horizontal and vertical orientations of the image pickup apparatus 1A, and therefore the user can obtain the high operability even when the image pickup apparatus is used in the vertical orientation which is not the standard orientation. Furthermore, the respective custom keys C1 to C3 are arranged in the range where the finger of the right hand griping the image pickup apparatus 1A in the horizontal orientation reaches, and therefore it is possible to obtain the high operability also when the image pickup apparatus is used in the horizontal orientation corresponding to the standard orientation.

Figure 13A:
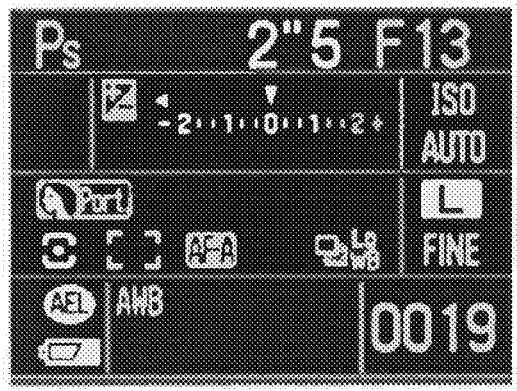
FIGS. 13A and 13B are views for describing a display of a liquid crystal panel in accordance with a detection result in an orientation detection unit.
Figure 13B:

It should be noted that in the image pickup apparatus 1A, the assigned functions to the custom keys C1 to C3 are switched in accordance with the detection result of the orientation detection unit 136, but the constantly stable orientation detection is not necessarily performed in the orientation detection unit 136. In view of the above, even when the orientation detection is in an unstable situation, in order to notify the user of the currently detected orientation is the horizontal orientation or the vertical orientation, for example, it is preferable to perform the display on the liquid crystal display panel 96 in accordance with the detection result of the orientation detection unit 136. To be more specific, in a case where the detection result of the orientation detection unit 136 indicates the horizontal orientation, such a display as illustrated in FIG. 13A is performed. In a case where the detection result indicates the vertical orientation, such a display as illustrated in FIG. 13B is performed. With this configuration, the user visually recognizes the display mode of the liquid crystal display panel 96, and thus it is possible to understand the currently assigned functions to the custom keys C1 to C3 with certainty.

Second Embodiment

Main Part Configuration of Image Pickup Apparatus

An image pickup apparatus 1B according to a second embodiment of the present invention has a similar external configuration to that of the image pickup apparatus 1A according to the first embodiment illustrated in FIGS. 1 to 3. A difference resides in a function configuration as the orientation detection unit 136 is removed from the function configuration of the image pickup apparatus 1A illustrated in FIG. 4.

In this manner, the image pickup apparatus 1B is not provided with the orientation detection unit 136 (FIG. 4), and it is difficult to automatically detect whether the image pickup apparatus is in the horizontal orientation or the vertical orientation unlike the first embodiment.

In view of the above, in the image pickup apparatus 1B according to the present embodiment, the user inputs the orientation to the image pickup apparatus 1B, and the image pickup apparatus 1B obtains orientation information as to whether the orientation is the horizontal orientation or the vertical orientation. To be more specific, for the custom keys C1 to C3, a normal press state (first press state) is associated with the horizontal orientation and a long press state (second press state) is associated with the vertical orientation. Thus, in the case of the normal press, it is determined that the image pickup apparatus 1B is in the horizontal orientation. On the other hand, in the case of the long press, it is determined that the image pickup apparatus 1B is in the vertical orientation. In more detail, in accordance with a difference (long and short) in pressed periods of time for the custom keys C1 to C3, a plurality of pressed states (herein, the normal press state and the long press state) are distinguished and detected, and different orientations are associated with the respective pressed states. Herein, for example, a pressed state of the custom key over 1 second is determined as the "long press state" and a short pressed state of the custom key equal to or shorter than 1 second is determined as the "normal press state".

Also in the above-mentioned image pickup apparatus 1B, similarly to the first embodiment, it is possible to assign a plurality of functions to the custom keys C1 to C3. Hereinafter, a description will be provided of an operation of the image pickup apparatus 1B related to this function assignment.

Figure 14:
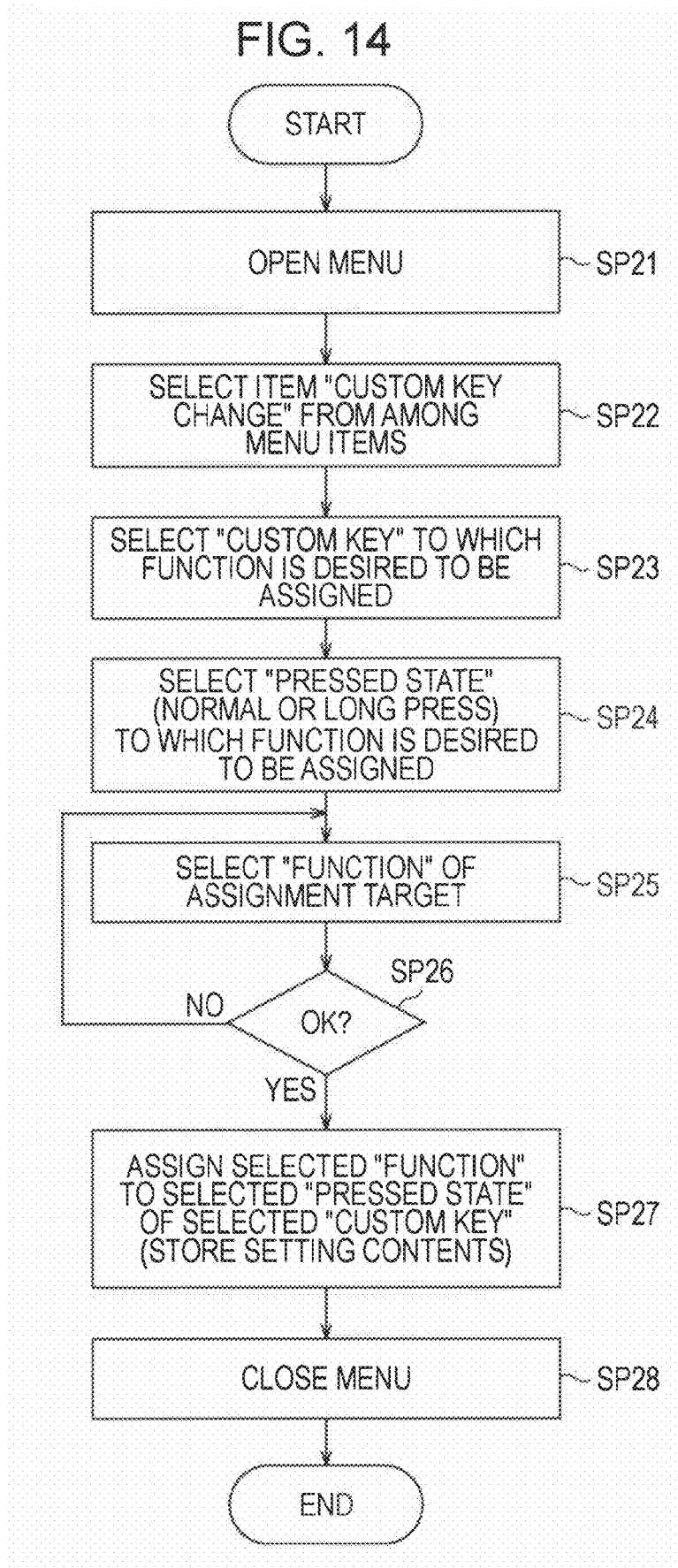
FIG. 14 is a flowchart for a setting change operation of assigned functions to custom keys C1 to C3 in an image pickup apparatus according to a second embodiment of the present invention.

FIG. 14 is a flowchart of the setting change operation related to the assignment function of the custom keys C1 to C3. FIGS. 15 to 19 respectively illustrate various screens G22 to G26 which are displayed on the back face monitor 12. With reference to these drawings, the setting change operation will be described. Herein, a case in which the function of the "play key" is assigned to a long press operation of the "custom key C3" equivalent to the input operation of the vertical orientation is exemplified, but the same applies to other assignment operation.

First, when the user presses the menu button 87, the image pickup apparatus 1B displays the menu screen G11 (refer to FIG. 6) on the back face monitor 12 (Step SP21).

Figure 15:
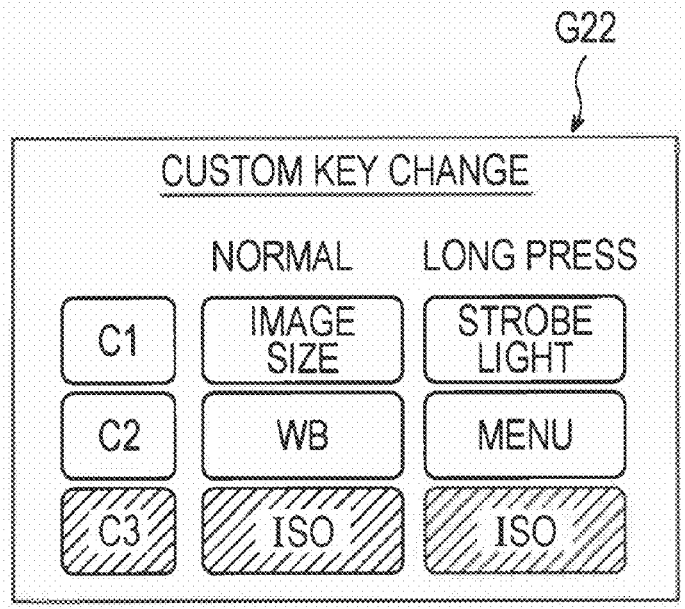
FIG. 15 illustrates another display screen of the back face monitor.
Figure 16:
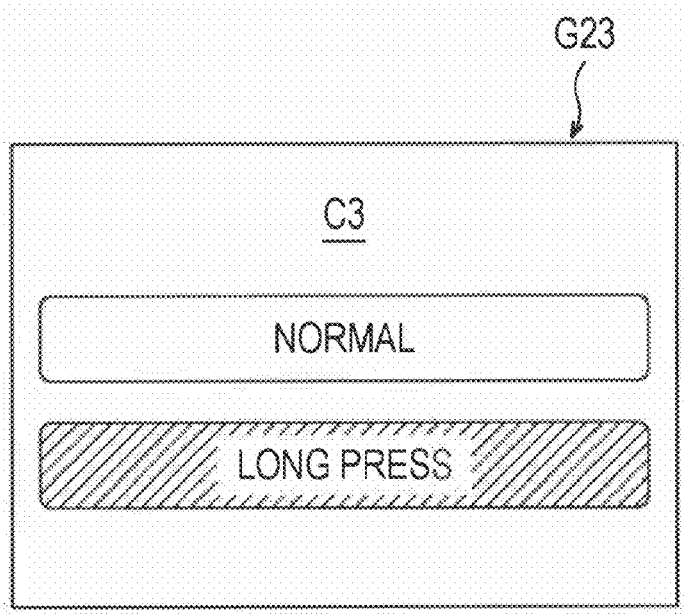
FIG. 16 illustrates another display screen of the back face monitor.
Figure 17:
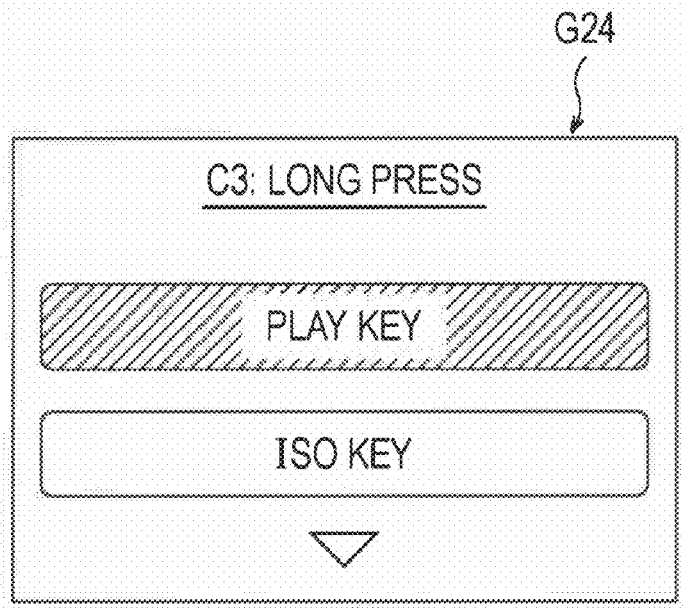
FIG. 17 illustrates another display screen of the back face monitor.
Figure 18:
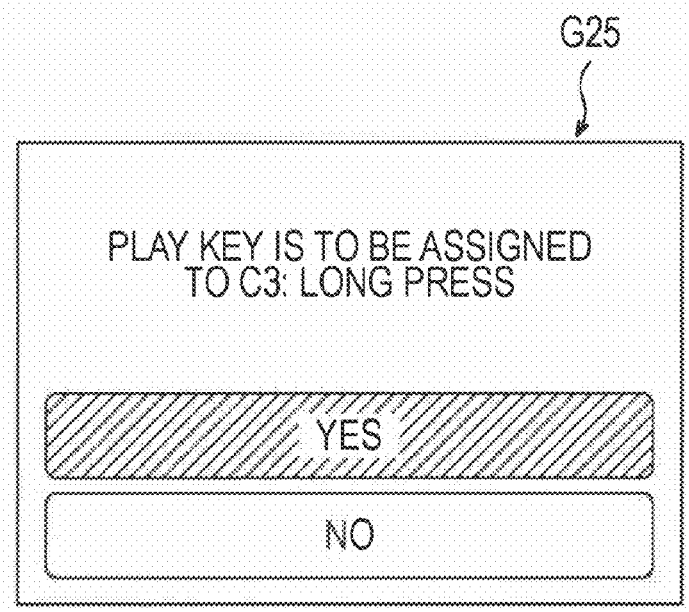
FIG. 18 illustrates another display screen of the back face monitor.

After that, when the user selects a desired option, that is, the "custom key change", from among a plurality of options (Step SP22), the image pickup apparatus 1B assumes an instruction input is performed so that the "custom key change" should be performed, and displays a screen G22 on the back face monitor 12 (FIG. 15).

The current assignment states are indicated on the screen G22. In more detail, for each of the three custom keys C1 to C3, the assigned content for the normal press state (the first press state) and the assigned content for the long press state (the second press state) are indicated. In FIG. 15, the "image size" is assigned to the normal press state of the custom key C1, and the "strobe light" is assigned to the long press state of the custom key C1. Also, the "WB" is assigned to the normal press state of the custom key C2, and the "menu" is assigned to the long press state of the custom key C2. Furthermore, the "ISO" is assigned to the normal press state of the custom key C3, and the "ISO" is also assigned to the long press state of the custom key C3.

Next, the user uses the multi selector 83 to select a custom key of the change target (the customization target) (herein, the custom key C3) from among the options displayed within the screen G22 (Step SP23). In response to the selection operation, the image pickup apparatus 1B identifies the custom key selected as the change target, and thereafter displays a screen G23 for selecting a "pressed state" which becomes the change target (FIG. 16) on the back face monitor 12.

The user uses the multi selector 83 to select the "pressed state" of the change target (herein, the "long press") from among options displayed on the screen G23 (Step SP24). In response to the selection operation, the image pickup apparatus 1B identifies the pressed state selected as the change target, and this time displays a screen G24 for displaying a list of assignable functions (FIG. 17) on the back face monitor 12.

The user uses the multi selector 83 to select a function that should be assigned from among options displayed on the screen G24 (Step SP25).

In response to this selection operation, the image pickup apparatus 1B identifies the function selected by the user as the assignment target and displays a screen G25 for confirming the selected contents (FIG. 18) (Step SP26). On the screen G25 of FIG. 18, a message is displayed for asking the user to confirm whether the setting contents "the play key is assigned to the long press operation of custom key C3" are correct.

When the user performs an input to indicate the setting contents are not correct, the flow is returned to Step SP25, where the processing is shifted to a re-selection operation of the assigned function. On the other hand, when the user performs an input to indicate the setting contents are correct, the flow is advanced to Step SP27.

In Step SP27, in order to assign the function selected in Step SP25 the custom key selected in Step SP23 and the pressed state selected in Step SP24, the image pickup apparatus 1B stores new setting contents. In more detail, the setting contents stored in the non-volatile memory 135 is overwritten by the new setting contents to update the setting contents. After that, the image pickup apparatus 1B finishes the "custom key change" operation, and the back face monitor 12 is returned to the display state before the press of the menu button 87 (Step SP28).

Figure 19:
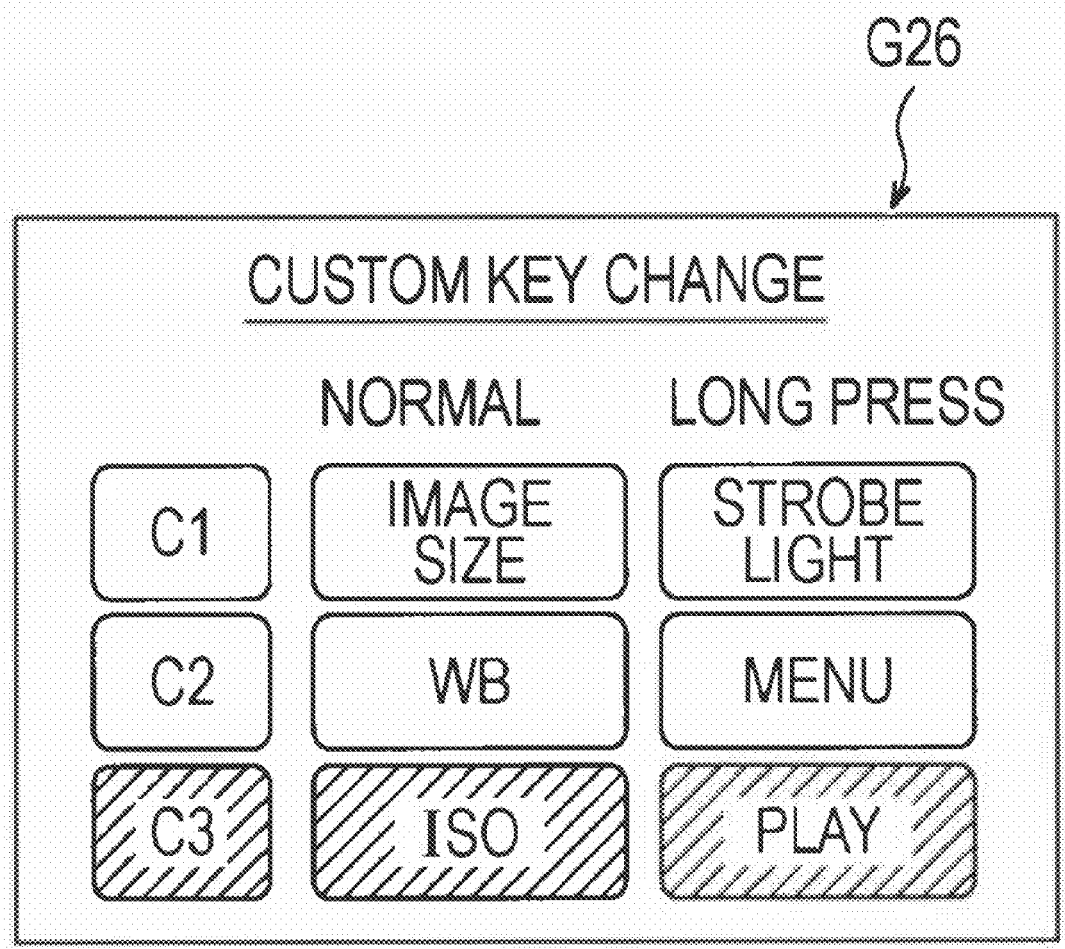
FIG. 19 illustrates another display screen of the back face monitor.

When the above-mentioned setting change operation is finished, as illustrated in a screen G26 of FIG. 19, the contents assigned to the respective custom keys C1 to C3 are changed. After the setting change, based on the new assigned contents, in response to the press on the respective custom keys C1 to C3, the function corresponding to the pressed key and the pressed state (the normal press or the long press) at the time of the key press is executed.

An operation of the image pickup apparatus 1B in which the two functions are set as described above in the respective custom keys C1 to C3 will be described below.

Operation of the Image Pickup Apparatus 1B

FIG. 20 is a flowchart for a basic operation of the image pickup apparatus 1B. The present operation is executed by the overall control unit of the image pickup apparatus 1B.

First, when the user operates the main switch 81 to turn the power supply ON, a processing for activating the image pickup apparatus 1B (initialization processing) is performed (Step ST21).

In Step ST22, similarly to Step ST12 of FIG. 12, it is determined whether the image pickup mode is set. Herein, in a case where the image pickup mode is set, the flow is advanced to Step ST23, and in a case where the image pickup mode is not set, the present flow is ended.

In Step ST23, it is determined whether one of the custom keys C1 to C3 is pressed by the user. Herein, in a case where the custom key is pressed, the flow is advanced to Step ST24, in a case where the custom key is not pressed, the flow is returned to Step ST22.

In Step ST24, it is determined whether the custom key is subjected to the long press. Herein, for example, in the case of the pressed state of the custom key over a period longer than 1 second, it is determined that the long press is performed. Herein, in a case where the custom key is subjected to the long press, the flow is advanced to Step ST25, and in the case of the normal press instead of the long press, the flow is advanced to Step ST26.

In Step ST25, a processing for assigning the function of the long press state to the pressed custom key is performed. For example, when the custom key C3 is pressed in a state where the function settings illustrated in FIG. 19 are performed, the "play" function is assigned.

In Step ST26, a processing for assigning the function of the normal press state to the pressed custom key is performed. For example, when the custom key C3 is pressed in a state where the function settings illustrated in FIG. 19 are performed, the "ISO" function is assigned.

Through the above-mentioned operation of the image pickup apparatus 1B, in the respective custom keys C1 to C3 arranged in the respective ranges where the finger of the right hand griping the image pickup apparatus 1B to which the vertical position control grip 7 is mounted in the horizontal orientation and the vertical orientation reaches, the assigned functions are switched in accordance with information on the horizontal and vertical orientations of the image pickup apparatus 1A which is input by the user. Not only in the case of using the image pickup apparatus in the horizontal orientation corresponding to the standard orientation, the user can obtain the high operability even when the image pickup apparatus is used in the vertical orientation which is not the standard orientation.

Also, in the image pickup apparatus 1B, in accordance with the normal press operation and the long press operation for the respective custom keys C1 to C3 by the user, the orientation information related to the image pickup apparatus 1B is obtained. Thus, even in a case where the image pickup apparatus is not provided with an orientation detection sensor, the function assignment in accordance with the orientation of the image pickup apparatus can be performed.

It should be noted that in the image pickup apparatus 1B, it may not be necessary to distinguish the normal press and the long press for the custom key to separately use the plurality of assigned functions. For example, the plurality of assigned functions may be separately used by way of half press and deep press of the key and single click and double click.

MODIFIED EXAMPLES

The functions which are the assignment targets to the respective custom keys C1 to C3 according to the above-mentioned embodiments are not necessarily limited to the functions assigned to the above-mentioned respective buttons 84, 85, 86, 87, 88a to 88d, 92, 93, 94a to 94d, and the like. Functions assigned to buttons other than the above-mentioned buttons provided to the image pickup apparatus may be assigned to the custom keys.

Also, functions assigned to operation members of other types than the buttons provided to the image pickup apparatus (for example, a slide switch, a dial, and the like) may be assigned to the custom keys. It should be noted that in a case where functions of operation members other than the buttons are assigned to the custom key, the above-mentioned idea may be applied while taking consideration of a difference in operation members. For example, in a case where a function of a certain dial is assigned to the custom key, such a configuration may be adopted that the similar operation in accordance with the rotation operation is replaced by the similar operation in accordance with the button press operation of the custom key. That is, the setting contents may be changed in accordance with the press operation of the custom key instead of the dial rotation operation.

According to the above-mentioned embodiments, the vertical position control grip 7 may not be necessarily mounted to the image pickup apparatus, and the vertical position control grip 7 may not be mounted. In this case, the operation of the shutter button 11 is difficult to perform by the finger of the right hand griping the image pickup apparatus in the vertical orientation (for example, the index finger), but it is possible to obtain the high operability for the custom keys C1 to C3 arranged in the range where the finger of the right hand griping the image pickup apparatus in the vertical orientation (for example, the thumb) reaches.

The configuration of the two function assignment in accordance with the normal press and the long press of the custom key according to the second embodiment may be added to the image pickup apparatus 1A according to the above-mentioned first embodiment. With this configuration, in the respective orientations (the horizontal orientation and the vertical orientation), it is possible to further assign a plurality of functions based on the distinction between the normal press and the long press.

The embodiments of the present invention can be applied, not only to the above-mentioned image pickup apparatuses, but also to electronic devices including a PDA (Personal Digital Assistants) and the like.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic device comprising:
a camera main body;
an interchangeable system image pickup lens unit detachably provided to the camera main body;
a grip unit provided on the camera main body that includes a first shutter button;
a vertical position control grip detachably provided to the camera main body that provides the electronic device a grip position separate from the grip unit for use in a vertical orientation;
an operation member provided on the camera main body which is arranged within a range where a particular finger related to right hand gripping the vertical position control grip in the vertical orientation reaches and in which assigned functions can be customized;
storage means for storing information on a first function and a second function which are set in the operation member as the assigned functions;
orientation information obtaining means for obtaining information on an orientation related to the electronic device;
function assignment control means for assigning the first function to the operation member when it is determined based on the information on the orientation that the electronic device is in a horizontal orientation and assign the second function to the operation member when it is determined based on the information on the orientation that the electronic device is in the vertical orientation,
wherein the horizontal orientation and the vertical orientation respectively correspond to a standard orientation and a non-standard orientation during use of the electronic device.

2. The electronic device according to claim 1,
wherein the grip unit provides a grip position for use in the horizontal orientation, and
wherein the operation member is arranged within a range where the particular finger related to the right hand gripping the grip unit in the horizontal orientation reaches.

3. The electronic device according to claim 1,
wherein the vertical position control grip is an auxiliary tool which can be attached to the electronic device when the electronic device is used in the non-standard orientation, and
wherein the operation member is arranged within a range where the particular finger related to the right hand gripping the electronic device to which the auxiliary tool is attached in the vertical orientation reaches.

4. The electronic device according to claim 1,
wherein the orientation information obtaining means includes
an orientation detection sensor adapted to detect an orientation of the electronic device, and
means for obtaining information on the orientation based on a detection result in the orientation detection sensor.

5. The electronic device according to claim 1,
wherein the operation member enables a press operation and a detection through a distinction between a first press state and a second press state in accordance with a difference in pressed periods of time related to the press operation, and
wherein the orientation information obtaining means includes means for obtaining information on the orientation by associating the first press state with the horizontal orientation and associating the second press state with the vertical orientation.

6. The electronic device according to claim 5, wherein the first press state corresponds to a comparatively shorter pressed period of time than a pressed period of time that corresponds to the second press state.

7. The electronic device according to claim 1, further comprising:
a back face monitor provided substantially at a center of a back face of the camera main body,
wherein the operation member is provided on the back face of the camera main body at a position between the back face monitor and the grip unit.

8. The electronic device according to claim 7, wherein the operation member includes a plurality of custom keys arranged adjacent to an edge of the back face monitor in a vertical direction of the camera main body.

9. The electronic device according claim 1, wherein the vertical position control grip is detachably provided to a bottom surface of the camera main body and the vertical position control grip includes a second shutter button.

10. An electronic device comprising:
a camera main body;
an interchangeable system image pickup lens unit detachably provided to the camera main body;
a grip unit provided on the camera main body that includes a first shutter button;
a vertical position control grip detachably provided to the camera main body that provides the electronic device a grip position separate from the grip unit for use in a vertical orientation;
an operation member provided on the camera main body which is arranged within a range where a particular finger related to right hand gripping the vertical position control grip in the vertical orientation reaches and in which assigned functions can be customized;
a storage unit adapted to store information on a first function and a second function which are set in the operation member as the assigned functions;
an orientation information obtaining unit adapted to obtain information on an orientation related to the electronic device;
a function assignment control unit adapted to assign the first function to the operation member when it is determined based on the information on the orientation that the electronic device is in a horizontal orientation and assign the second function to the operation member when it is determined based on the information on the orientation that the electronic device is in the vertical orientation, wherein the horizontal orientation and the vertical orientation correspond to a standard orientation and a non-standard orientation during use of the electronic device.

11. The electronic device according to claim 10, wherein the grip unit provides a grip position for use in the horizontal orientation, and wherein the operation member is arranged within a range where the particular finger related to the right hand gripping the grip unit in the horizontal orientation reaches.

12. The electronic device according to claim 10, wherein the orientation information obtaining unit includes an orientation detection sensor adapted to detect an orientation of the electronic device, and means for obtaining information on the orientation based on a detection result in the orientation detection sensor.

13. The electronic device according to claim 10, wherein the operation member enables a press operation and a detection through a distinction between a first press state and a second press state in accordance with a difference in pressed periods of time related to the press operation, and wherein the orientation information obtaining unit obtains information on the orientation by associating the first press state with the horizontal orientation and associating the second press state with the vertical orientation.

14. The electronic device according to claim 13, wherein the first press state corresponds to a comparatively shorter pressed period of time than a pressed period of time that corresponds to the second press state.

15. The electronic device according to claim 10, further comprising:

a back face monitor provided substantially at a center of a back face of the camera main body, wherein the operation member is provided on the back face of the camera main body at a position between the back face monitor and the grip unit.

16. The electronic device according to claim 15, wherein the operation member includes a plurality of custom keys arranged adjacent to an edge of the back face monitor in a vertical direction of the camera main body.

17. The electronic device according claim 10, wherein the vertical position control grip is detachably provided to a bottom surface of the camera main body and the vertical position control grip includes a second shutter button.

* * * * *